(12) United States Patent
Makhal et al.

(10) Patent No.: US 12,725,238 B2
(45) Date of Patent: Sep. 1, 2026

(54) METHODS, APPARATUSES AND COMPUTER PROGRAM PRODUCTS FOR DEPALLETIZING MIXED OBJECTS

(71) Applicant: Intelligrated Headquarters, LLC, Mason, OH (US)

(72) Inventors: Abhijit Makhal, Maryland Heights, MO (US); Devesh Walawalkar, Pittsburgh, PA (US); Ayush Jhalani, Pittsburgh, PA (US)

(73) Assignee: Intelligrated Headquarters, LLC, Mason, OH (US)

( * ) Notice: Subject to any disclaimer, the term of this patent is extended or adjusted under 35 U.S.C. 154(b) by 528 days.

(21) Appl. No.: 17/937,999

(22) Filed: Oct. 4, 2022

(65) Prior Publication Data

US 2023/0133113 A1 May 4, 2023

Related U.S. Application Data

(60) Provisional application No. 63/263,223, filed on Oct. 28, 2021.

(51) Int. Cl.
*G06T 7/00* (2017.01)
*G06T 1/00* (2006.01)
(Continued)

(52) U.S. Cl.
CPC .......... *G06T 7/0004* (2013.01); *G06T 1/0014* (2013.01); *G06T 7/11* (2017.01);
(Continued)

(58) Field of Classification Search
CPC ....... G06T 2200/04; G06T 2207/30108; G06T 7/0004; G06T 7/11; G06T 7/62;
(Continued)

(56) References Cited

U.S. PATENT DOCUMENTS 5,582,504 A * 12/1996 Cestonaro .............. B65G 61/00 414/801
2015/0203304 A1 7/2015 Morency et al.
(Continued)

FOREIGN PATENT DOCUMENTS

CN 205526810 U 8/2016
CN 108328347 A 7/2018
(Continued)

OTHER PUBLICATIONS

European search report Mailed on Mar. 28, 2023 for EP Application No. 22201156, 9 page(s).
(Continued)

*Primary Examiner* — John Villecco
*Assistant Examiner* — Joshua B. Crockett
(74) *Attorney, Agent, or Firm* — Alston & Bird LLP

(57) ABSTRACT

Methods, apparatuses, systems, computing devices, and/or the like are provided. An example method may include receiving, from a perception subsystem associated with an object depalletization system, first imaging data associated with a plurality of objects disposed on a pallet; calculate, based at least in part on the first imaging data, one or more comparative dimension measures associated with the plurality of objects; determine whether the one or more comparative dimension measures satisfy a comparative dimension threshold range; and in response to determining that the one or more comparative dimension measures satisfy the comparative dimension threshold range, cause an execution subsystem associated with the object depalletization system to operate in a constant pallet mode.

20 Claims, 22 Drawing Sheets

(51) Int. Cl.
*G06T 7/11* (2017.01)
*G06T 7/62* (2017.01)
*B65G 59/02* (2006.01)
*B65G 61/00* (2006.01)
*G06Q 10/08* (2024.01)

(52) U.S. Cl.
CPC ................ *G06T 7/62* (2017.01); *B65G 59/02* (2013.01); *B65G 61/00* (2013.01); *G06Q 10/08* (2013.01); *G06T 2200/04* (2013.01); *G06T 2207/30108* (2013.01)

(58) Field of Classification Search
CPC ........ G06T 1/0014; G05B 2219/40006; G05B 2219/39001; G05B 2219/37425; G05B 2219/40584; B25J 19/021; B25J 19/023; B25J 9/16; B65G 43/08; B65G 2203/041; B65G 67/24; B65G 59/02; B65G 61/00; B65G 2811/095; B65G 2201/025; B65G 2203/044
See application file for complete search history.

(56) References Cited

U.S. PATENT DOCUMENTS

| | | | | |
|---|---|---|---|---|
| 2016/0347558 | A1* | 12/2016 | Eto ........................ | B65G 59/04 |
| 2018/0046858 | A1 | 2/2018 | Chen et al. | |
| 2018/0304468 | A1 | 10/2018 | Holz | |
| 2019/0220990 | A1 | 7/2019 | Goja et al. | |
| 2020/0002107 | A1 | 1/2020 | Morency et al. | |
| 2020/0130963 | A1 | 4/2020 | Diankov et al. | |
| 2020/0134828 | A1* | 4/2020 | Diankov ................ | G06T 7/001 |
| 2021/0114826 | A1* | 4/2021 | Simon .................... | B25J 9/1697 |
| 2021/0269262 | A1* | 9/2021 | Mori ........................ | B25J 9/026 |
| 2022/0121837 | A1* | 4/2022 | Cesic ....................... | G05D 1/69 |
| 2022/0135346 | A1* | 5/2022 | Matsuoka .............. | G06Q 10/08 700/245 |
| 2022/0184666 | A1* | 6/2022 | Wicks ..................... | B07C 5/362 |
| 2023/0041343 | A1* | 2/2023 | Yu .......................... | B25J 9/1638 |
| 2023/0260071 | A1* | 8/2023 | Chavez .................. | H04N 23/10 382/153 |

FOREIGN PATENT DOCUMENTS

| | | | |
|---|---|---|---|
| CN | 108341273 | A | 7/2018 |
| CN | 109436820 | A | 3/2019 |
| CN | 111587444 | A | 8/2020 |
| CN | 112509043 | A | 3/2021 |
| CN | 113191174 | A | 7/2021 |
| EP | 1893512 | B1 | 3/2009 |
| EP | 3868522 | A1 | 8/2021 |
| JP | H11-322271 | A | 11/1999 |
| WO | 2006/117814 | A1 | 11/2006 |

OTHER PUBLICATIONS

EP Office Action Mailed on Sep. 4, 2024 for EP Application No. 22201156, 7 page(s).
Communication about intention to grant a European patent Mailed on Oct. 30, 2025 for EP Application No. 22201156, 6 page(s).
Decision to grant a European patent Mailed on Feb. 12, 2026 for EP Application No. 22201156, 2 page(s).
CN Office Action Mailed on Mar. 18, 2026 for CN Application No. 202211271895, 9 page(s).
English Translation of CN Office Action dated Mar. 18, 2026 for CN Application No. 202211271895, 15 page(s).

* cited by examiner

METHODS, APPARATUSES AND COMPUTER PROGRAM PRODUCTS FOR DEPALLETIZING MIXED OBJECTS

CROSS-REFERENCE TO RELATED APPLICATIONS

The present application claims priority to and benefit of U.S. Provisional Patent Application No. 63/263,223, filed Oct. 28, 2021, the content of which is incorporated by reference in its entirety.

BACKGROUND

Palletizing refers to an operation of loading or conveying an object (such as, but not limited to, a carton, a box, an article, and/or the like) onto a pallet or a similar device. Depalletizing refers to the operation of unloading or moving an object (such as, but not limited to, a carton, a box, an article, and/or the like) away from a pallet or a similar device.

Many palletization and/or depalletization solutions are plagued by technical challenges and difficulties. For example, if one or more objects on a pallet have different sizes, many depalletization solutions fail to properly unload or move these objects away from the pallet, and/or may require more time to unload or move these objects away from the pallet compared to the time these depalletization solutions take when unloading or moving the objects that have the same size from the pallet.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to receive, from a perception subsystem associated with an object depalletization system, first imaging data associated with a plurality of objects disposed on a pallet; calculate, based at least in part on the first imaging data, one or more comparative dimension measures associated with the plurality of objects; determine whether the one or more comparative dimension measures satisfy a comparative dimension threshold range; and in response to determining that the one or more comparative dimension measures satisfy the comparative dimension threshold range, cause an execution subsystem associated with the object depalletization system to operate in a constant pallet mode.

In some embodiments, the perception subsystem comprises a two dimensional (2-D) image capturing device. In some embodiments, the first imaging data comprises 2-D image data associated with the plurality of objects and captured by the 2-D image capturing device.

In some embodiments, the perception subsystem comprises a three dimensional (3-D) image capturing device. In some embodiments, the first imaging data comprises 3-D image data associated with the plurality of objects and captured by the 3-D image capturing device.

In some embodiments, prior to calculating the one or more comparative dimension measures associated with the plurality of objects, the at least one non-transitory memory and the computer program code are configured to, with the at least one processor, cause the apparatus to: input the first imaging data to an object segmentation machine learning model, wherein the first imaging data comprises at least one of 2-D image data associated with the plurality of objects; and receive, from the object segmentation machine learning model, a plurality of object segmentation indications associated with the at least one of 2-D image data.

In some embodiments, calculating the one or more comparative dimension measures is based at least in part on the plurality of object segmentation indications.

In some embodiments, the plurality of objects comprises a first object and a second object disposed on a same pallet layer of the pallet.

In some embodiments, when calculating the one or more comparative dimension measures associated with the plurality of objects, the at least one non-transitory memory and the computer program code are configured to, with the at least one processor, cause the apparatus to: determine, based at least in part on 2-D image data or 3-D image data from the perception subsystem, a first image-dimension measure associated with the first object; determine, based at least in part on the 2-D image data or the 3-D image data from the perception subsystem, a second image-dimension measure associated with the second object; and determine a comparative dimension measure of the one or more comparative dimension measures based at least in part on the first image-dimension measure and the second image-dimension measure.

In some embodiments, the first image-dimension measure associated with the first object is a first image length measure associated with the first object. In some embodiments, the second image-dimension measure associated with the second object is a second image length measure associated with the second object. In some embodiments, the comparative dimension measure is a comparative length measure. In some embodiments, the comparative dimension threshold range is a comparative length threshold range.

In some embodiments, the first image-dimension measure associated with the first object is a first image width measure associated with the first object. In some embodiments, the second image-dimension measure associated with the second object is a second image width measure associated with the second object. In some embodiments, the comparative dimension measure is a comparative width measure. In some embodiments, the comparative dimension threshold range is a comparative width threshold range.

In some embodiments, the first image-dimension measure associated with the first object is a first image height measure associated with the first object. In some embodiments, the second image-dimension measure associated with the second object is a second image height measure associated with the second object. In some embodiments, the comparative dimension measure is a comparative height measure. In some embodiments, the comparative dimension threshold range is a comparative height threshold range.

In some embodiments, the execution subsystem comprises a height sensing device. In some embodiments, the execution subsystem comprises a depalletizer device.

In some embodiments, the depalletizer device is configured to convey each of the plurality of objects over the height sensing device.

In some embodiments, the at least one non-transitory memory and the computer program code are configured to, with the at least one processor, cause the apparatus to: cause the depalletizer device to convey each of the plurality of objects over the height sensing device.

In some embodiments, the at least one non-transitory memory and the computer program code are configured to, with the at least one processor, cause the apparatus to: cause the depalletizer device to convey a first object from the plurality of objects over the height sensing device; receive, from the height sensing device, first height data associated with the first object; and determine a lift height parameter associated with the depalletizer device in the constant pallet mode based at least in part on the first height data.

In some embodiments, the at least one non-transitory memory and the computer program code are configured to, with the at least one processor, cause the apparatus to: cause the depalletizer device to lift one or more objects other than the first object from the plurality of objects to a same lift height based at least in part on the lift height parameter when the execution subsystem is in the constant pallet mode.

In some embodiments, when the execution subsystem is in the constant pallet mode, the depalletizer device is configured to: lift one or more objects other than the first object from the plurality of objects to a same lift height based at least in part on the lift height parameter.

In some embodiments, the at least one non-transitory memory and the computer program code are configured to, with the at least one processor, cause the apparatus to: cause the depalletizer device to lift a second object from the plurality of objects to a lift height based at least in part on the lift height parameter when the execution subsystem is in the constant pallet mode; and cause the depalletizer device to convey the second object over the height sensing device.

In some embodiments, the at least one non-transitory memory and the computer program code are configured to, with the at least one processor, cause the apparatus to: receive, from the height sensing device, second height data associated with the second object; calculate an object height difference measure between the first object and the second object; and determine whether the object height difference measure satisfies an object height difference measure threshold range.

In some embodiments, the at least one non-transitory memory and the computer program code are configured to, with the at least one processor, cause the apparatus to: in response to determining that the object height difference measure does not satisfy the object height difference measure threshold range, cause the execution subsystem associated with the object depalletization system to exit the constant pallet mode.

In some embodiments, the at least one non-transitory memory and the computer program code are configured to, with the at least one processor, cause the apparatus to: in response to determining that the depalletizer device has conveyed each of the plurality of objects that are on the same pallet layer, cause the execution subsystem associated with the object depalletization system to exit the constant pallet mode.

In some embodiments, the first imaging data is associated with a first capture time point. In some embodiments, the at least one non-transitory memory and the computer program code are configured to, with the at least one processor, cause the apparatus to: determine a first mean object height measure associated with the plurality of objects; and store, in a memory element, the first mean object height measure.

In some embodiments, the at least one non-transitory memory and the computer program code are configured to, with the at least one processor, cause the apparatus to: determine a second mean object height measure; calculate an average height difference measure based on the first mean object height measure and the second mean object height measure; and determine whether the average height difference measure satisfies an average height difference measure threshold range.

In some embodiments, the at least one non-transitory memory and the computer program code are configured to, with the at least one processor, cause the apparatus to: in response to determining that the average height difference measure satisfies the average height difference measure threshold range, replace the first mean object height measure in the memory element with the second mean object height measure.

In accordance with various embodiments of the present disclosure, a computer-implemented method is provided. The computer-implemented method may comprise receiving, from a perception subsystem associated with an object depalletization system, first imaging data associated with a plurality of objects disposed on a pallet; calculating, based at least in part on the first imaging data, one or more comparative dimension measures associated with the plurality of objects; determining whether the one or more comparative dimension measures satisfy a comparative dimension threshold range; and in response to determining that the one or more comparative dimension measures satisfy the comparative dimension threshold range, causing an execution subsystem associated with the object depalletization system to operate in a constant pallet mode.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to receive, from a perception subsystem associated with an object depalletization system, first imaging data associated with a plurality of objects disposed on a pallet; calculate, based at least in part on the first imaging data, one or more comparative dimension measures associated with the plurality of objects; determine whether the one or more comparative dimension measures satisfy a comparative dimension threshold range; and in response to determining that the one or more comparative dimension measures satisfy the comparative dimension threshold range, cause an execution subsystem associated with the object depalletization system to operate in a constant pallet mode.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 4:
Figure 4:
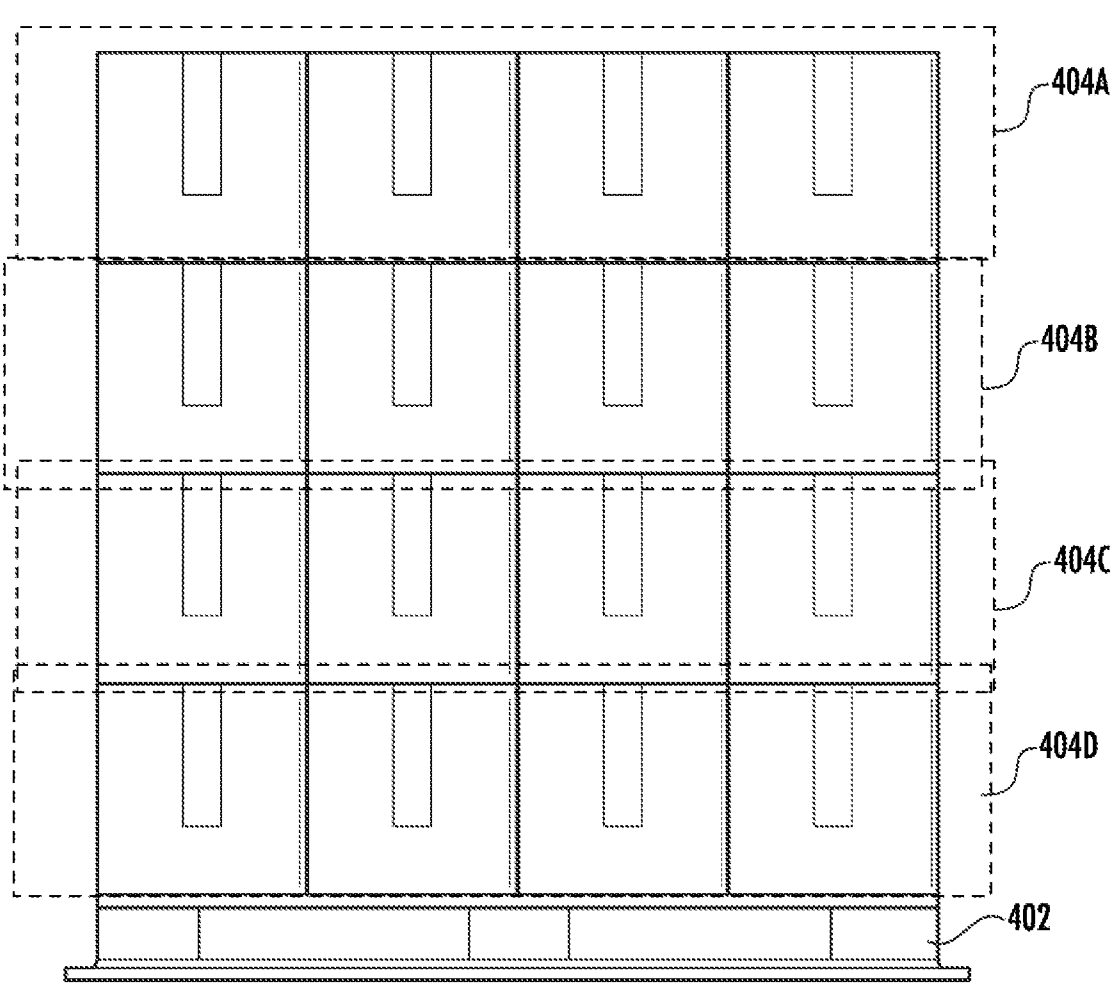
Figure 5:
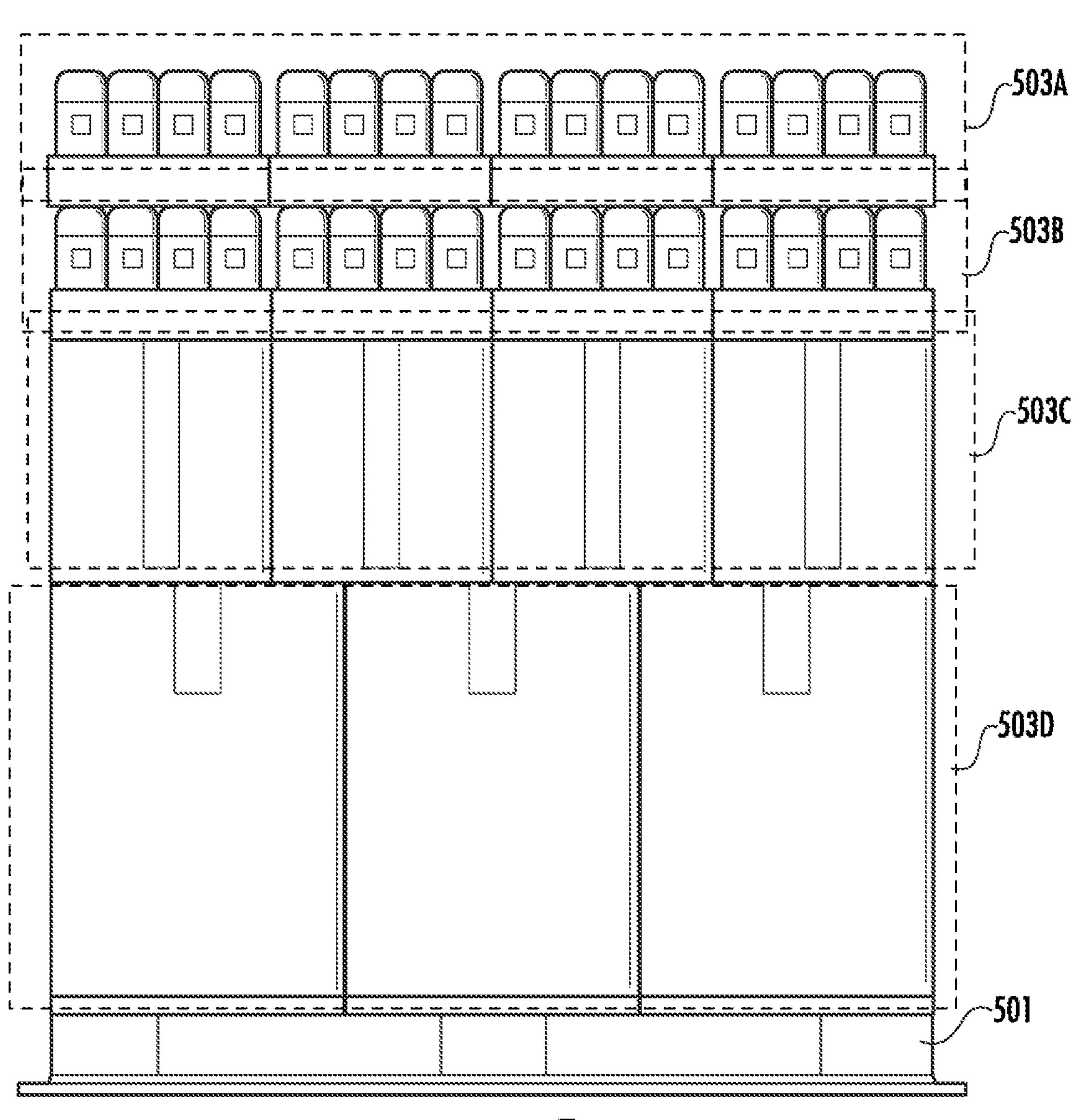
Figure 6:
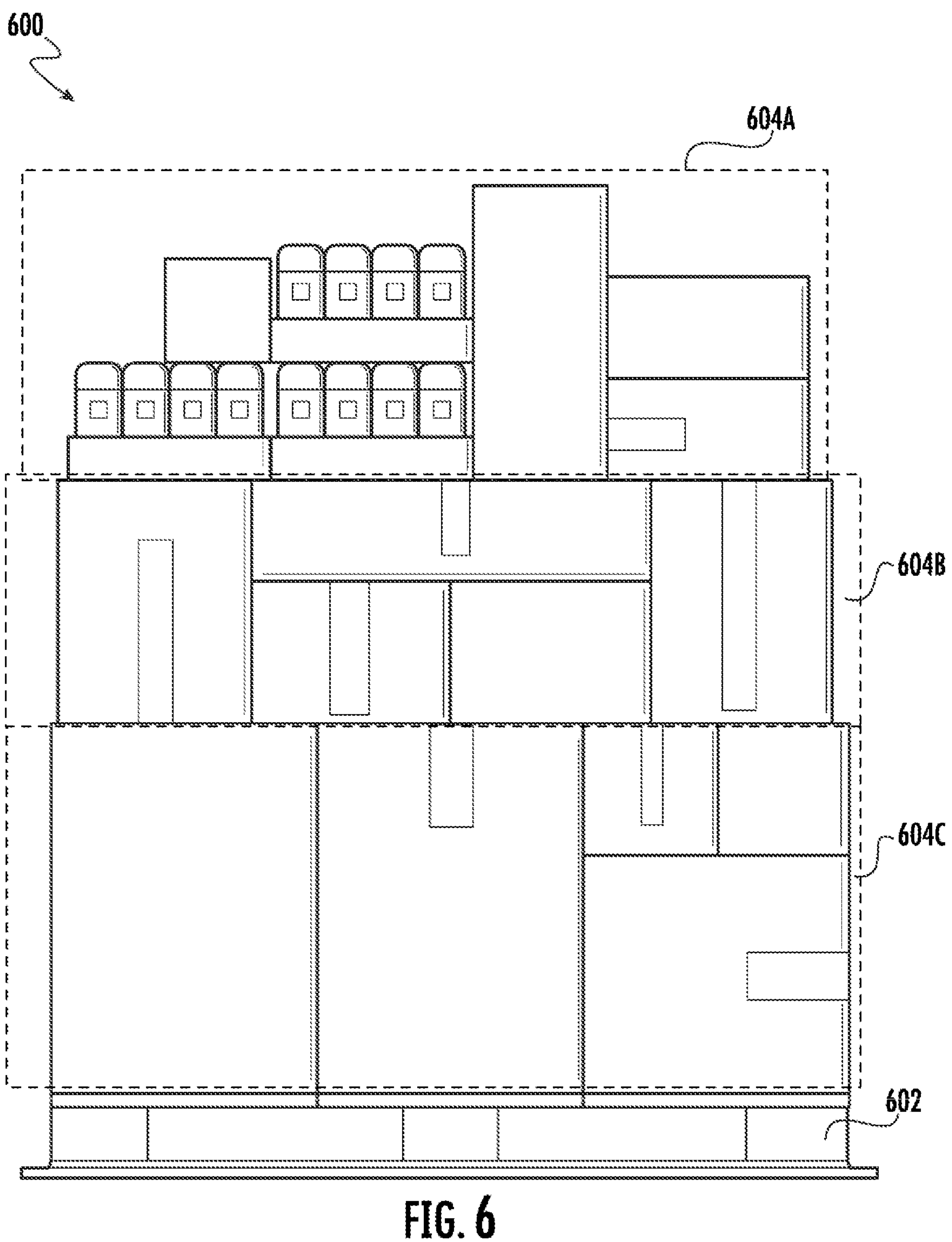
Figure 7A:
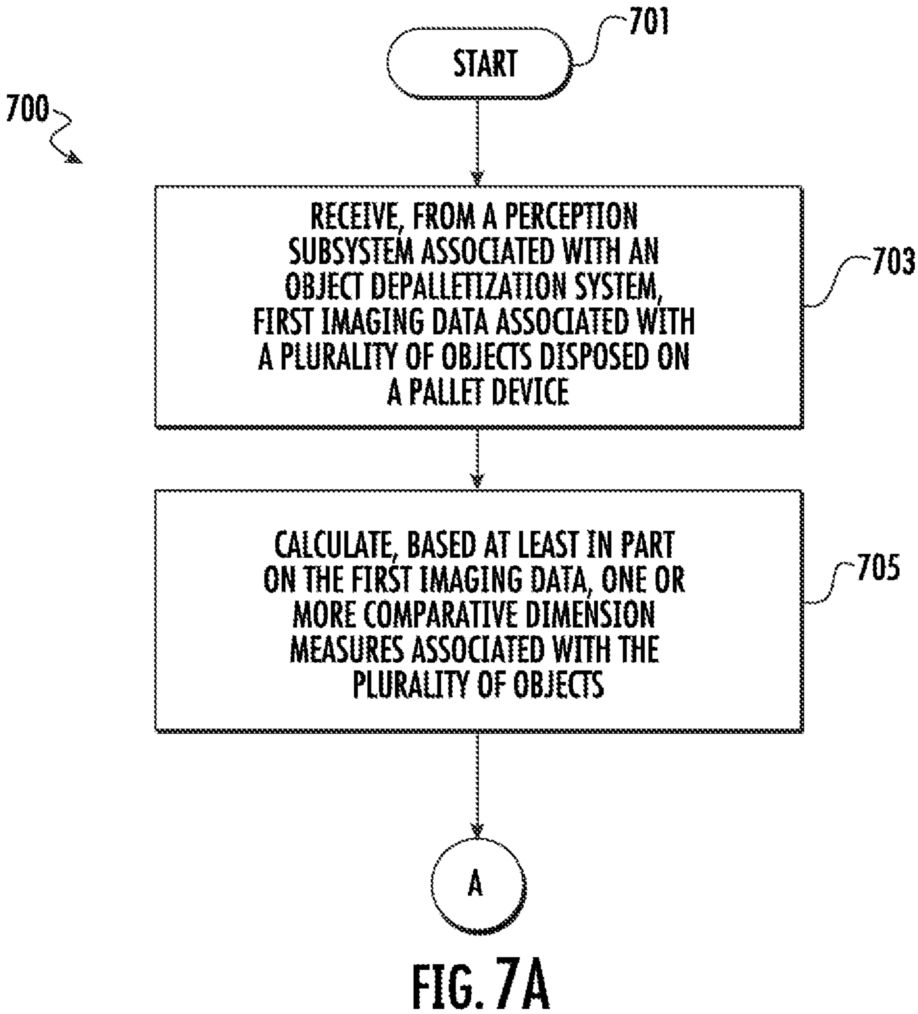
Figure 7B:
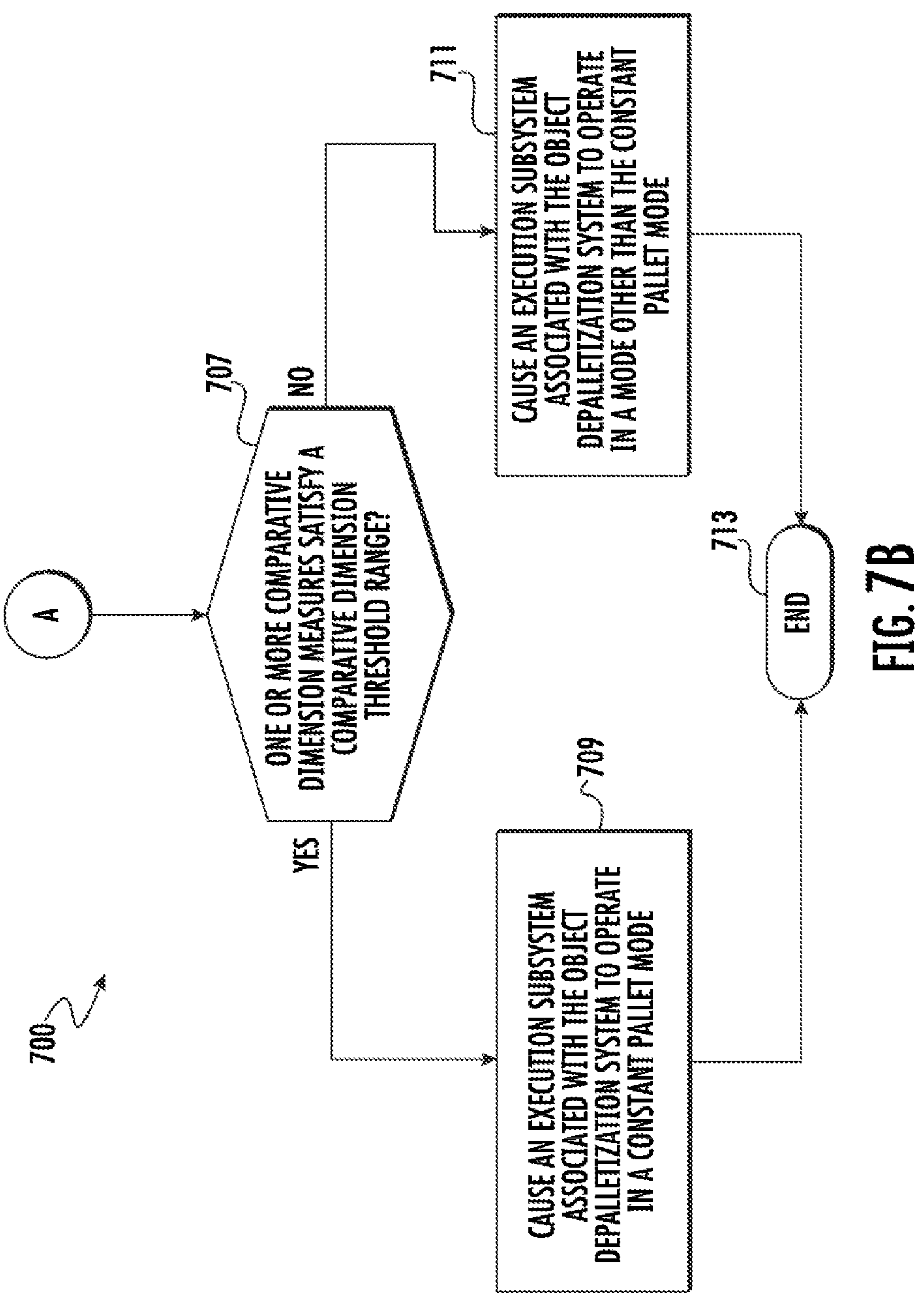
Figure 8:
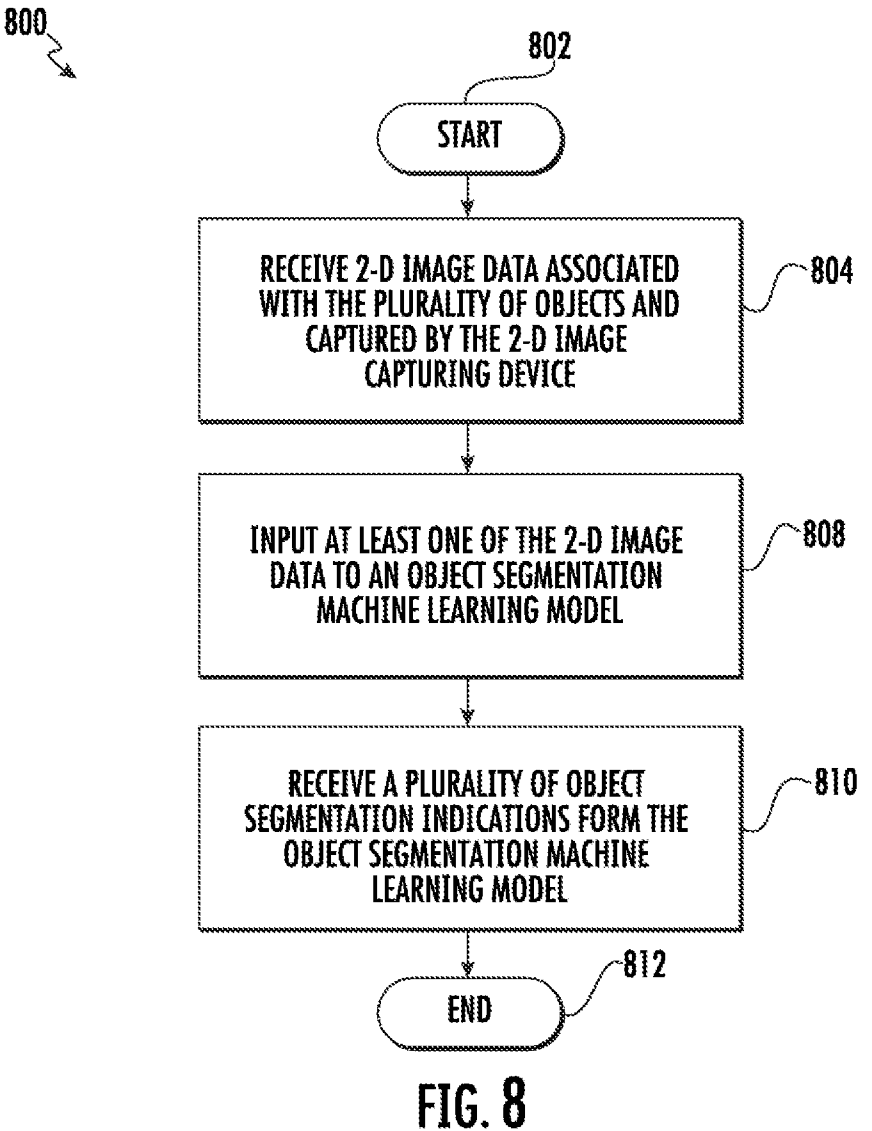
Figure 9:
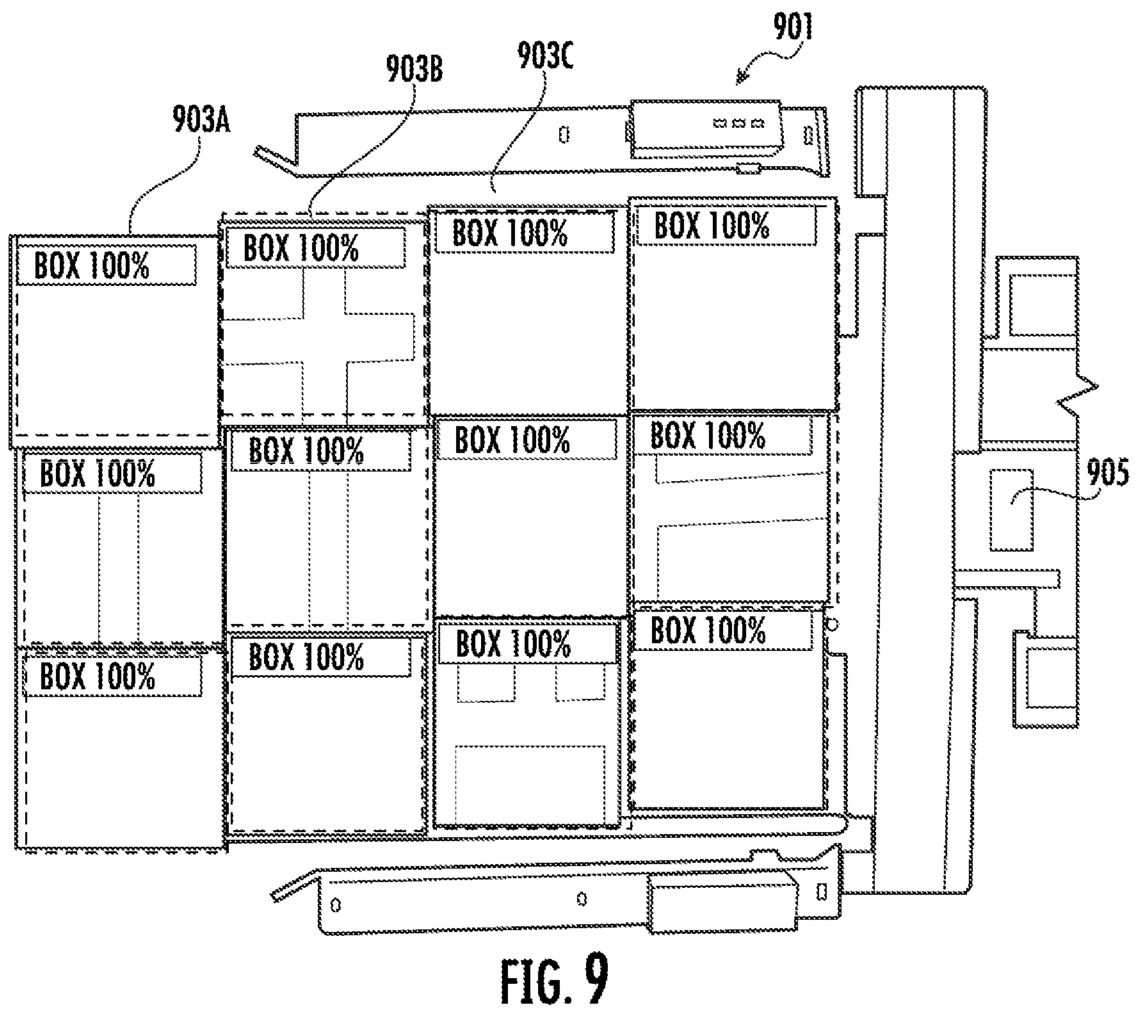
Figure 10:
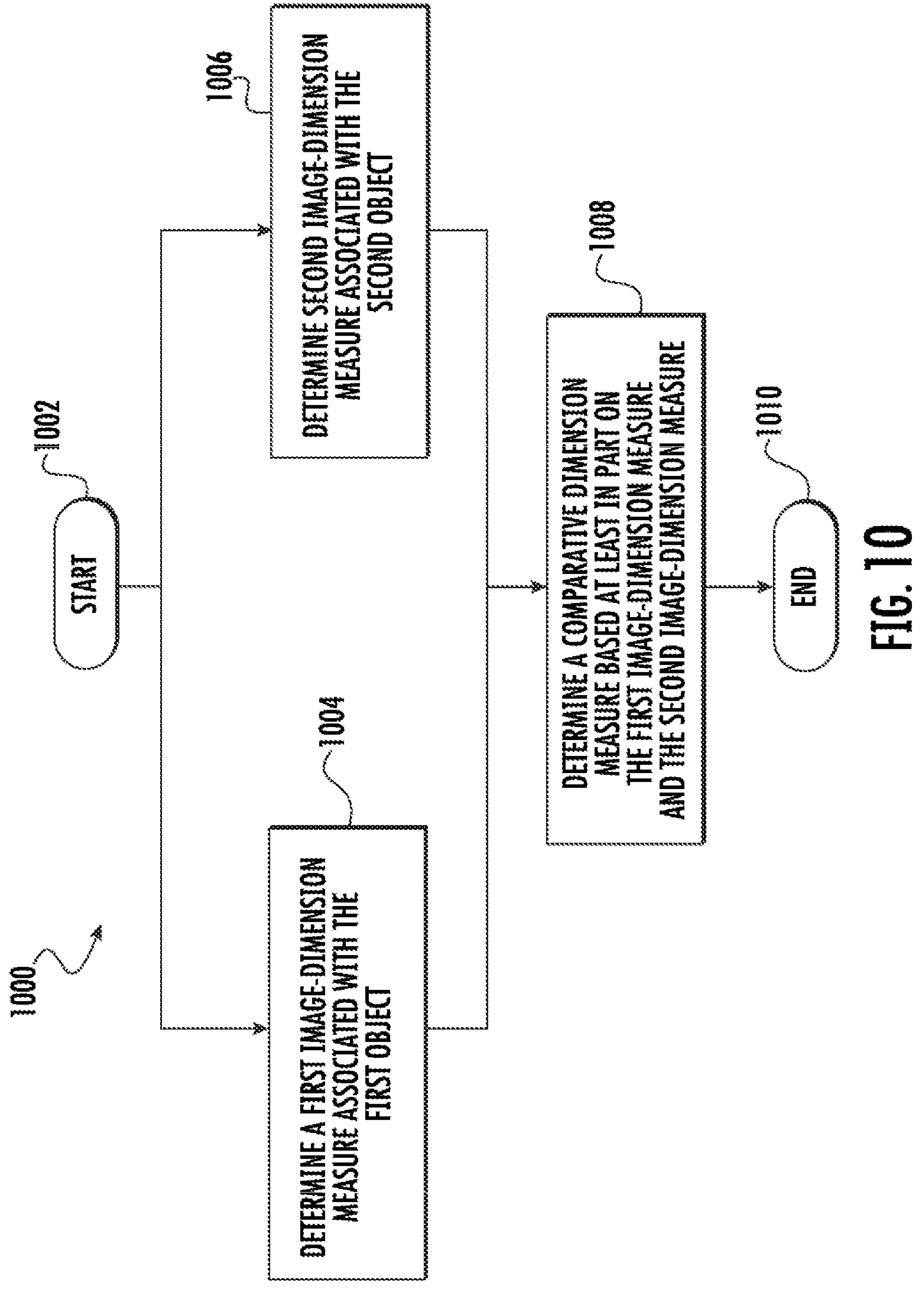
Figure 11A:
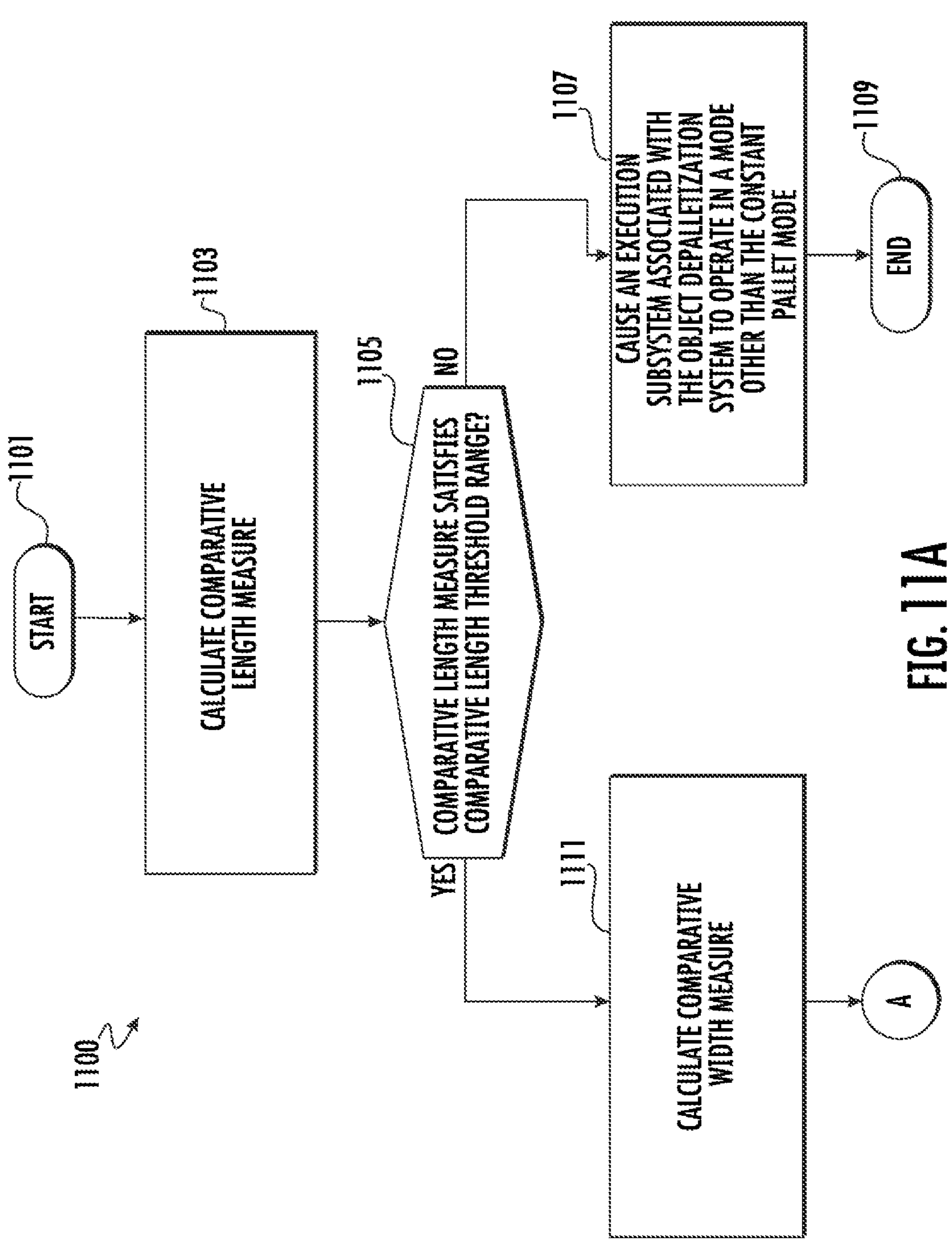
Figure 11B:
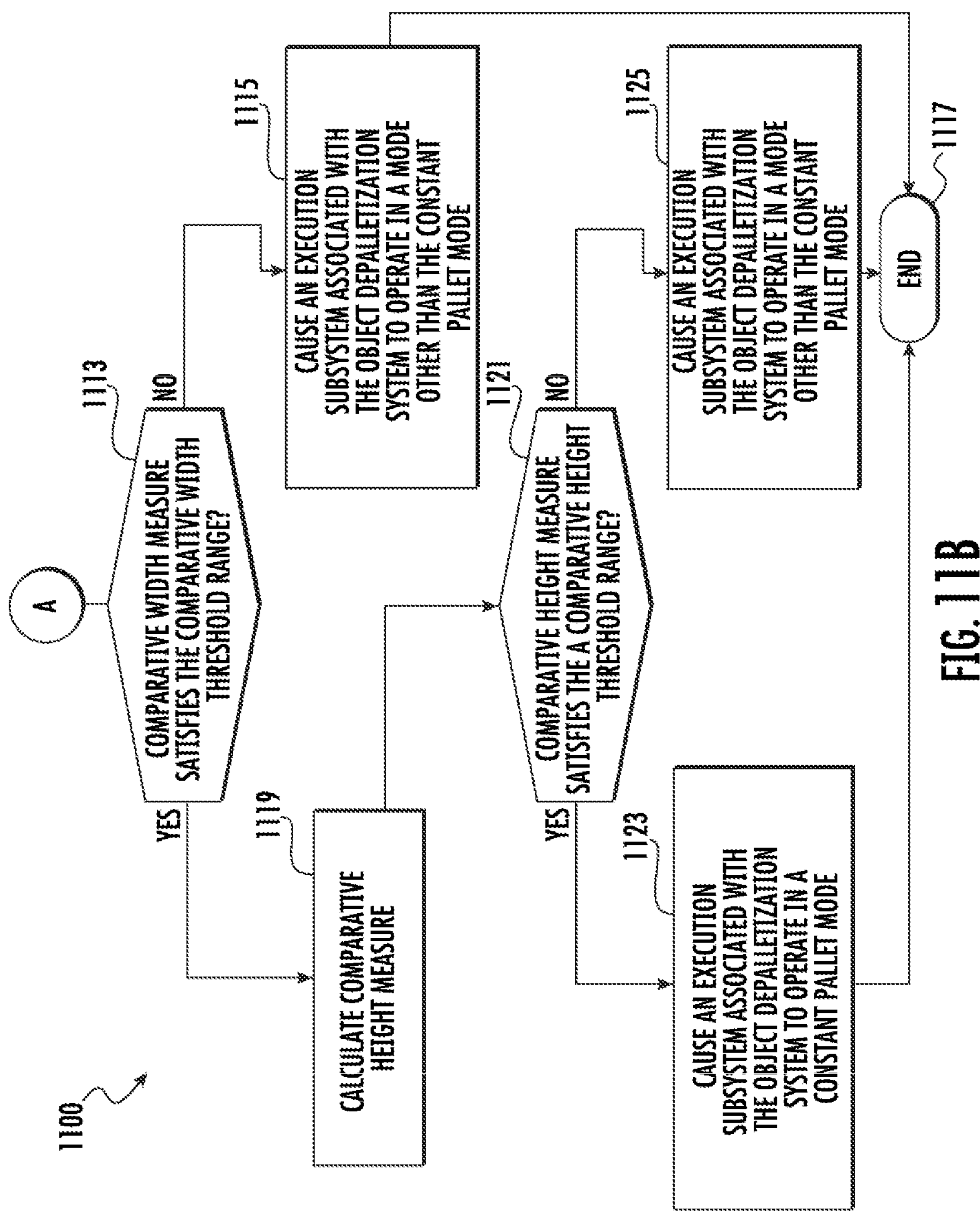
Figure 12:
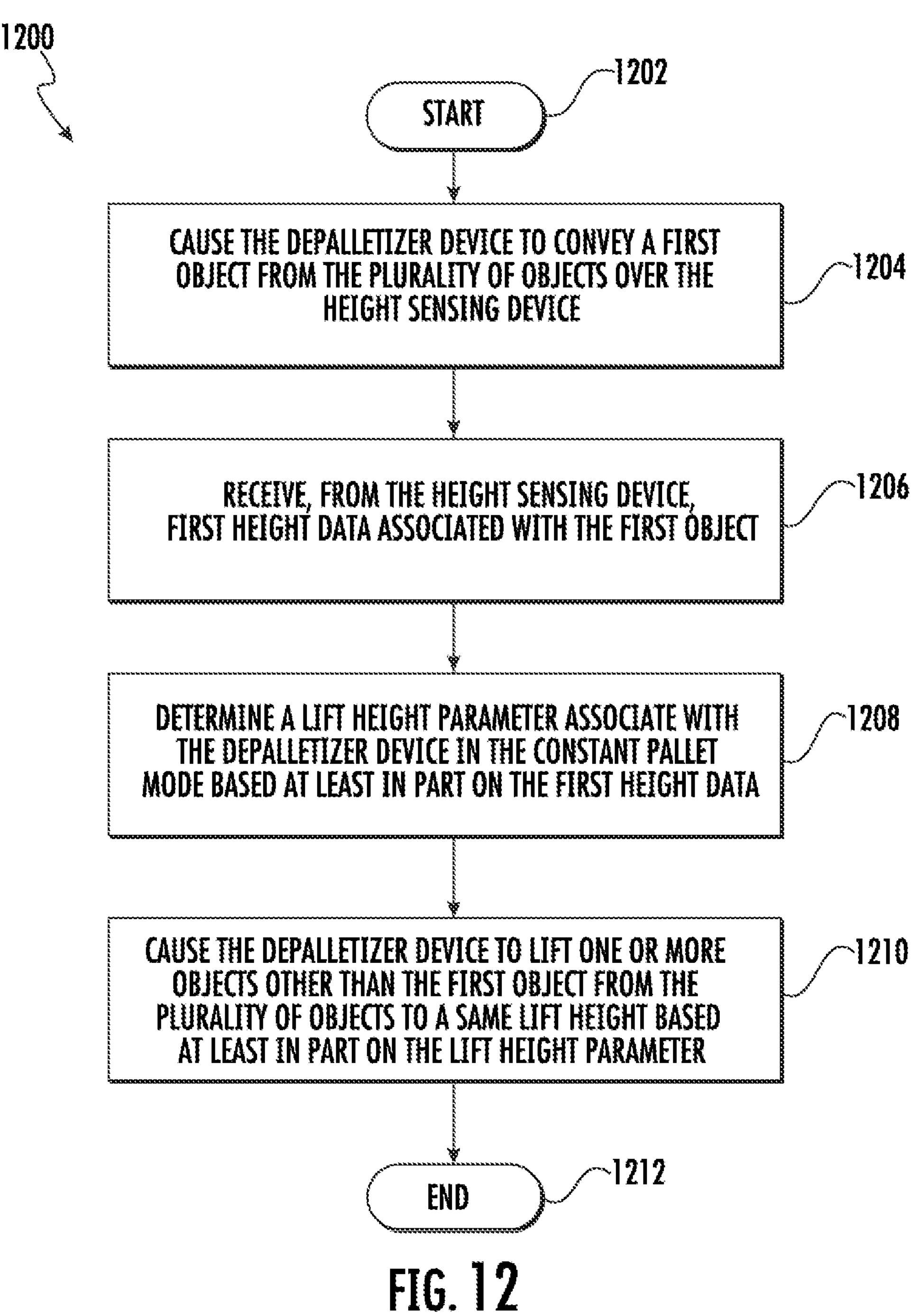
Figure 13:
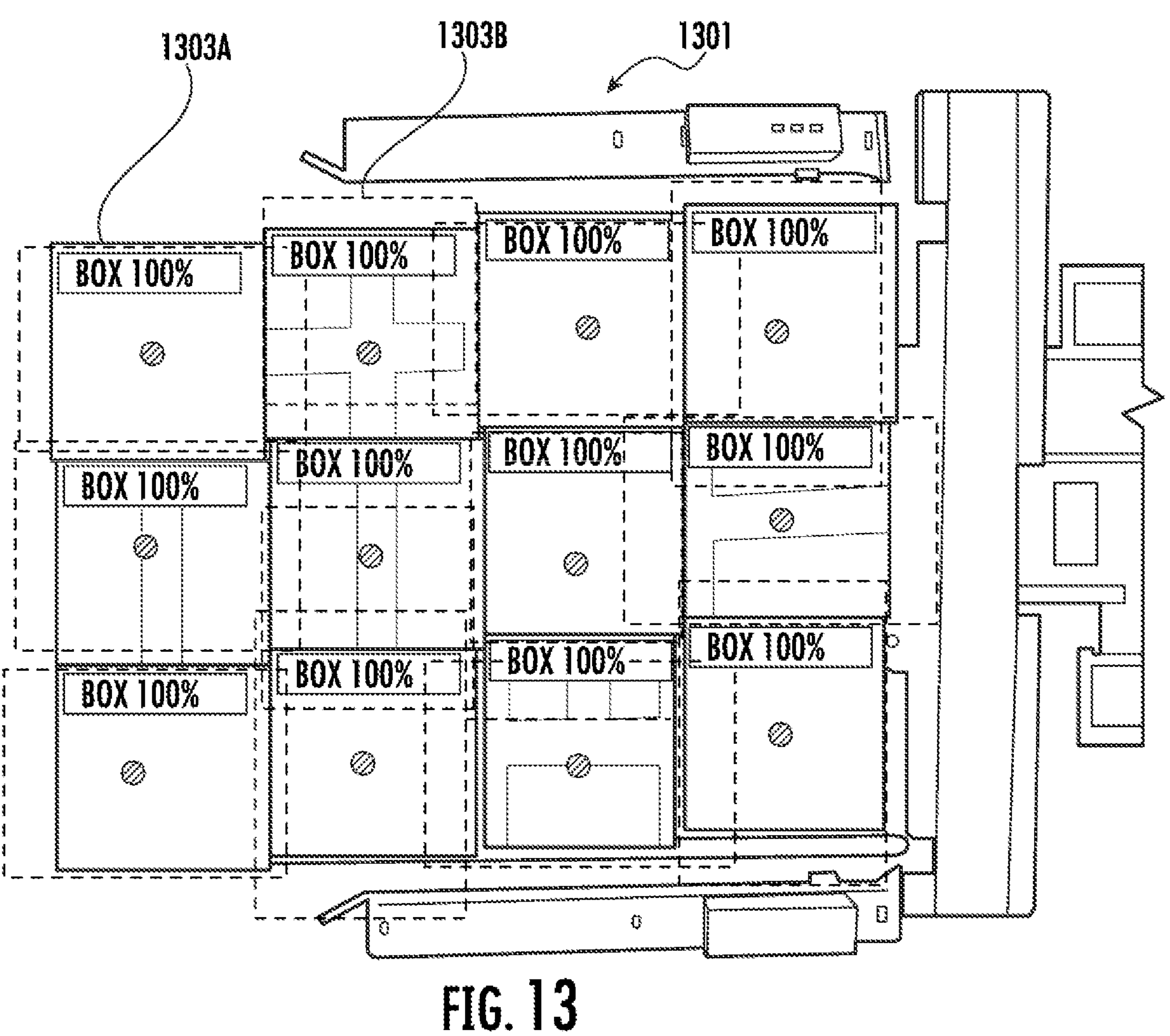
Figure 14A:
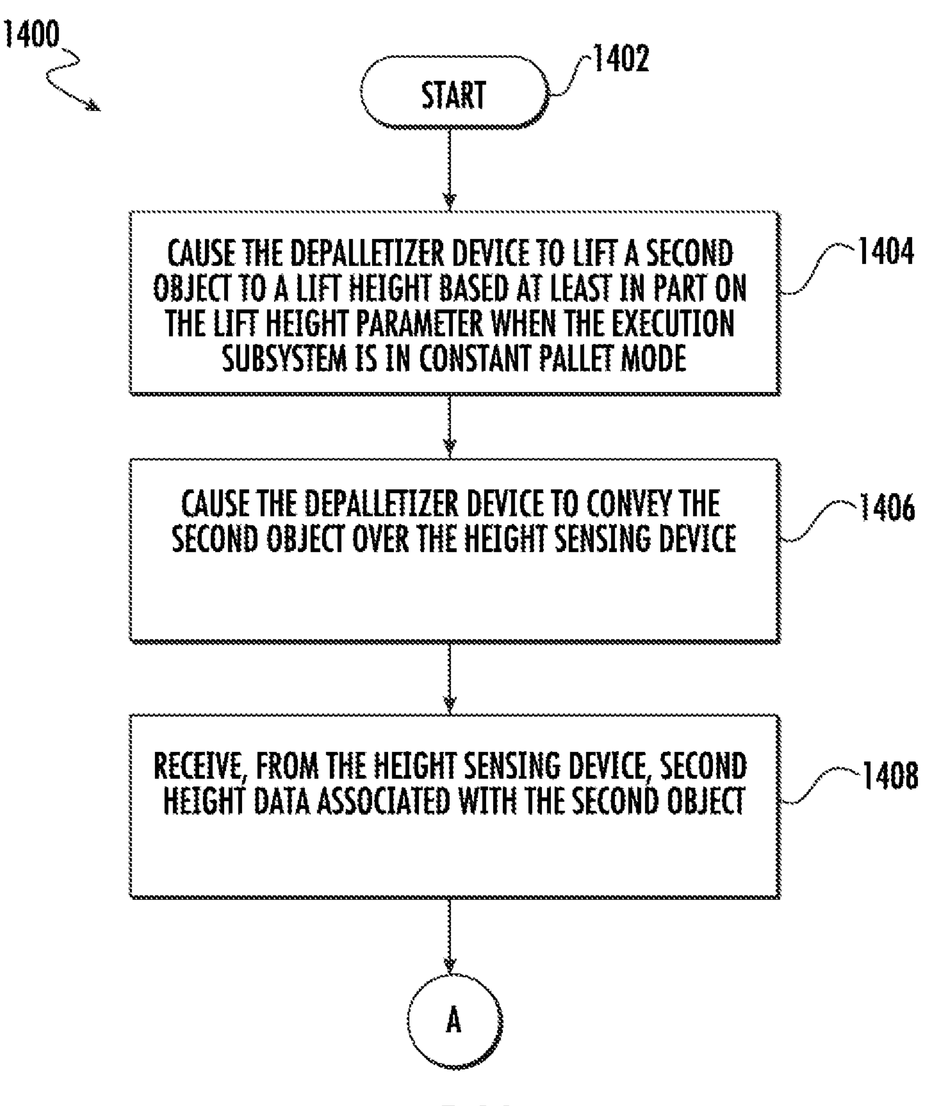
Figure 14B:
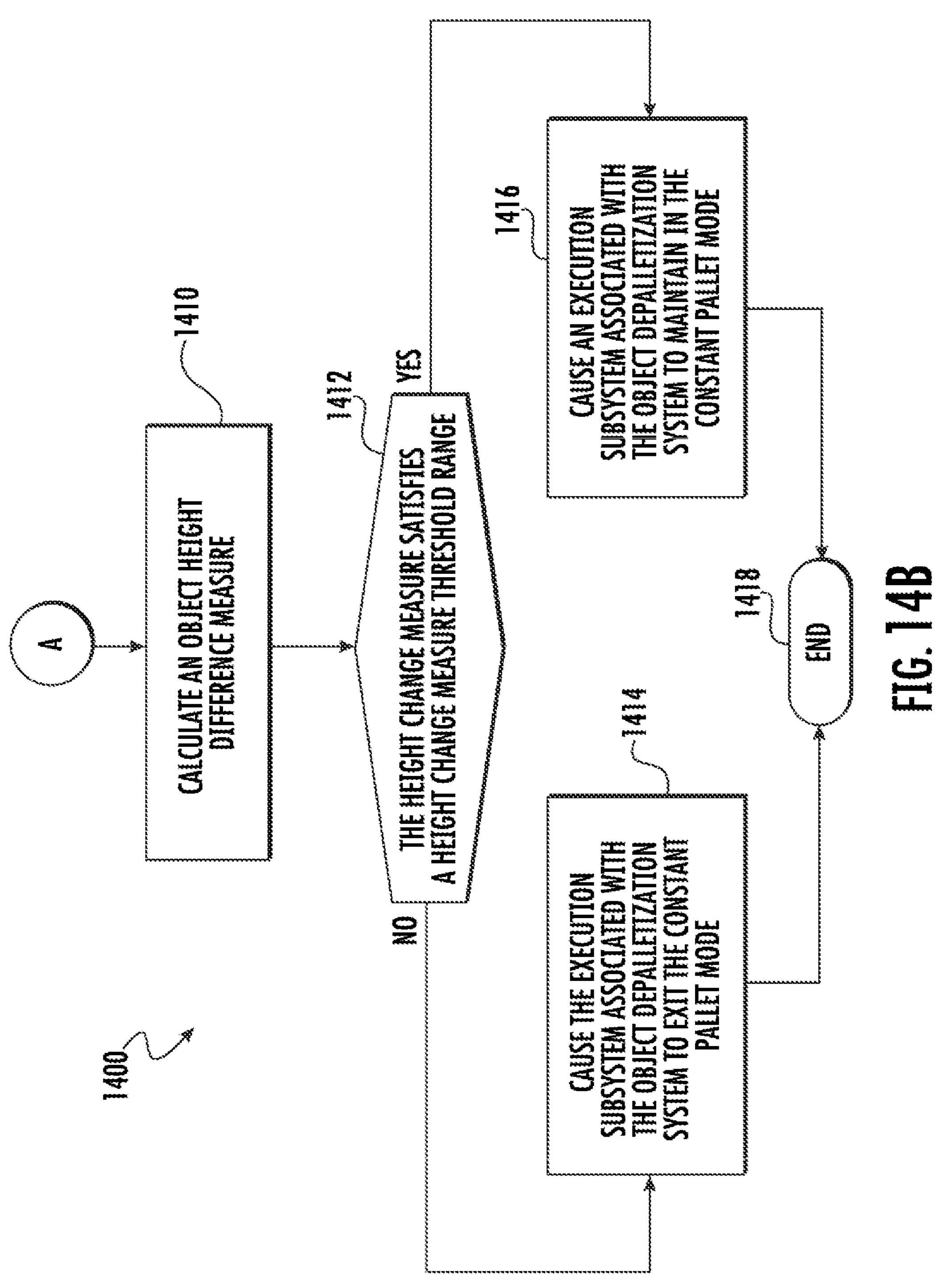
Figure 15:
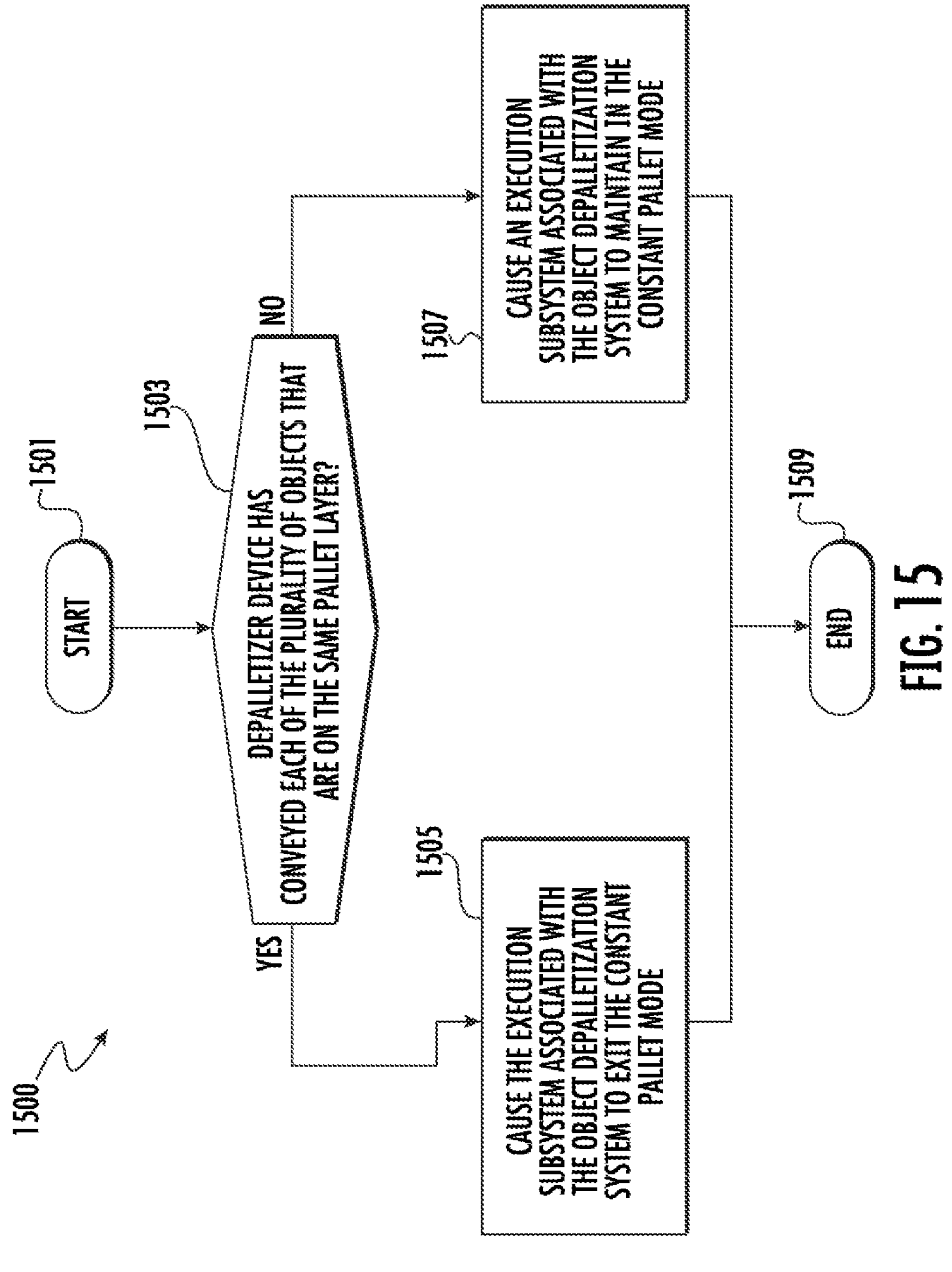
Figure 16A:
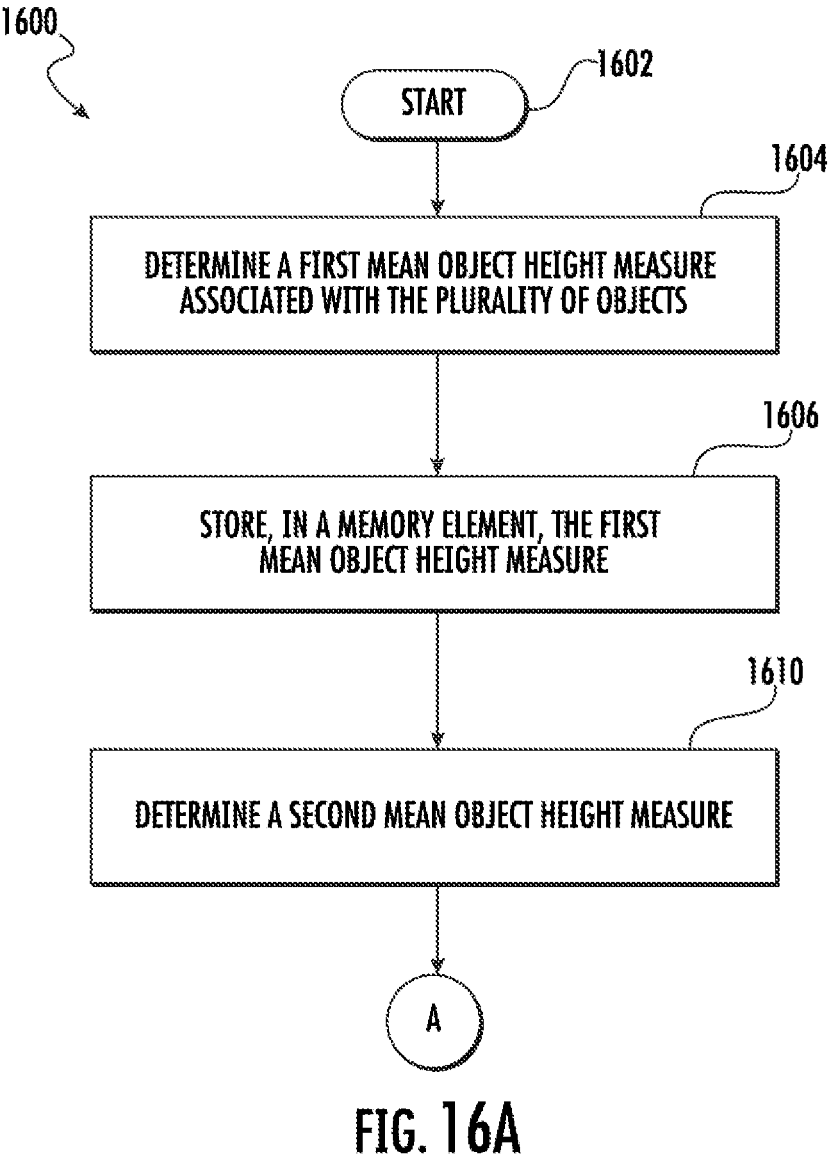
Figure 16B:
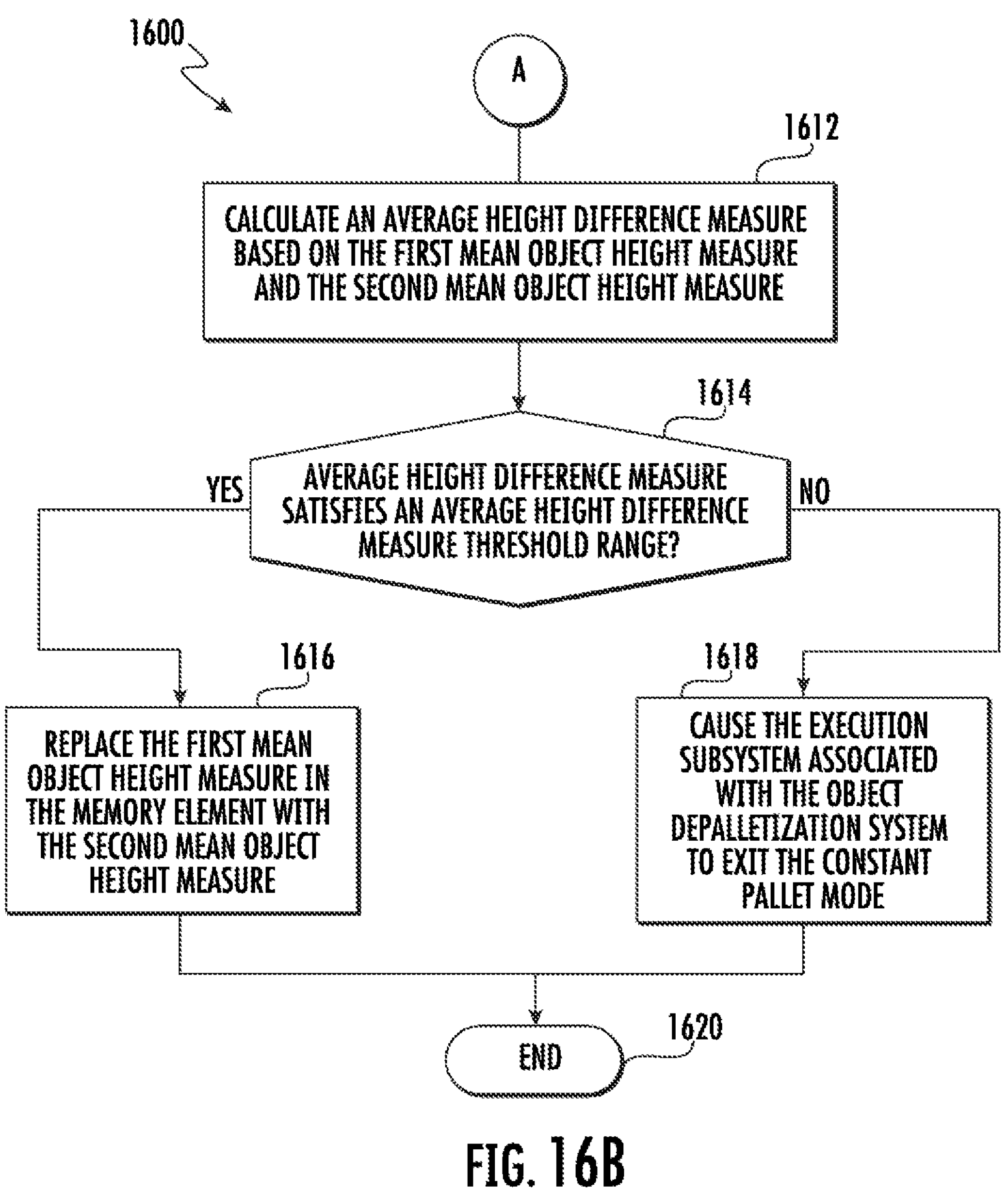
Figure 17:
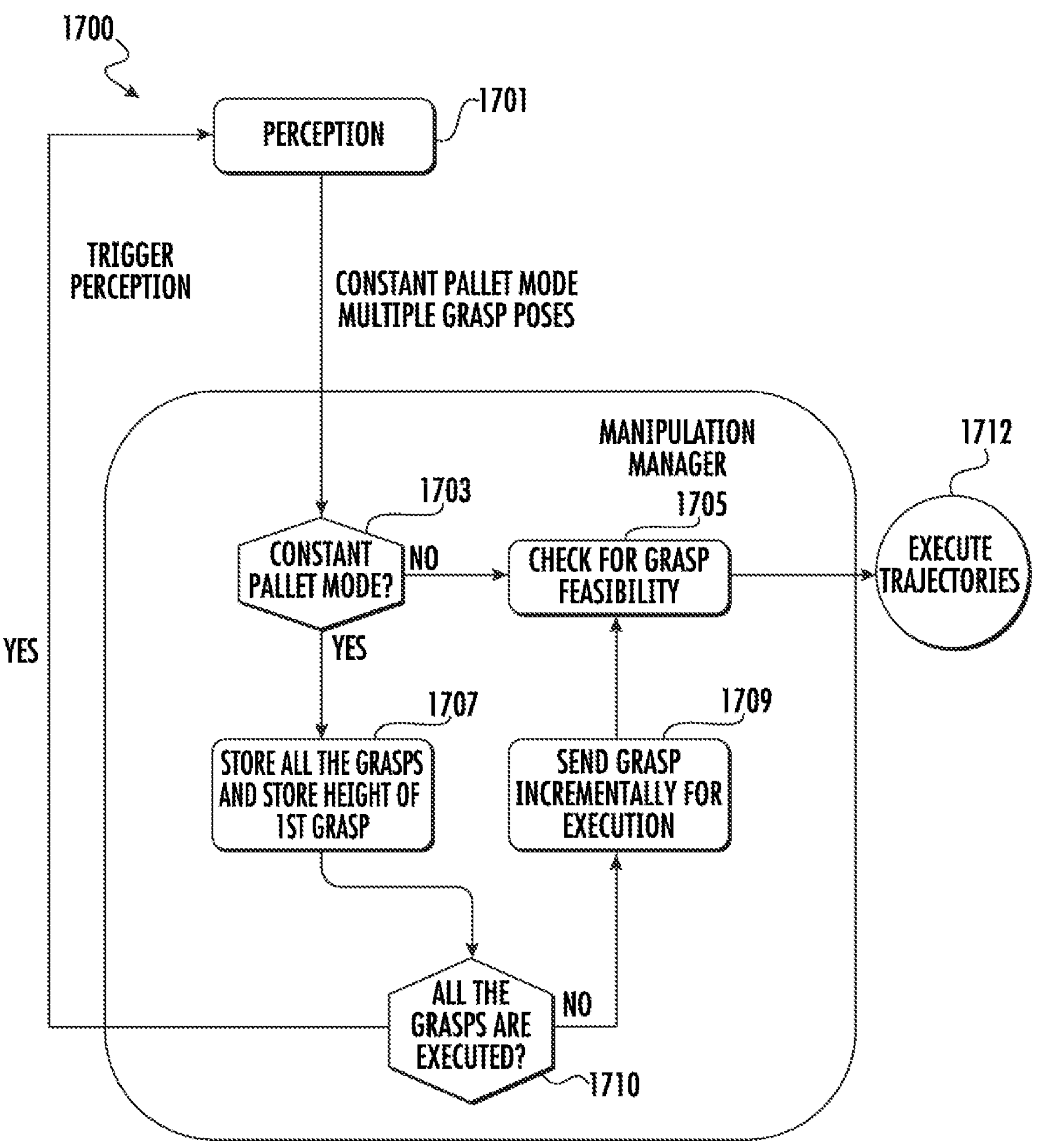

FIG. 4, FIG. 5, and FIG. 6 are example diagrams illustrating example pallet layers on example pallets in accordance with various embodiments of the present disclosure;

FIG. 7A and FIG. 7B are example flow diagrams illustrating an example method of determining whether to cause an execution subsystem associated with the object depalletization system to operate in a constant pallet mode in accordance with various embodiments of the present disclosure;

FIG. 8 is an example flow diagram illustrating an example method of generating object segmentation indications in accordance with various embodiments of the present disclosure;

FIG. 9 is an example image illustrating example object segmentation indications in accordance with various embodiments of the present disclosure;

FIG. 10 is an example flow diagram illustrating an example method of determining a comparative dimension measure in accordance with various embodiments of the present disclosure;

FIG. 11A and FIG. 11B are example flow diagrams illustrating an example method of determine whether one or more comparative dimension measures satisfy comparative dimension threshold ranges in accordance with various embodiments of the present disclosure;

FIG. 12 is an example flow diagram illustrating an example method of causing an execution subsystem associated with the object depalletization system to operate in a constant pallet mode in accordance with various embodiments of the present disclosure;

FIG. 13 is an example image illustrating example operations of the execution subsystem in a constant pallet mode in accordance with various embodiments of the present disclosure;

FIG. 14A and FIG. 14B are example flow diagrams illustrating an example method of determining whether to cause the execution subsystem associated with the object depalletization system to exit the constant pallet mode in accordance with various embodiments of the present disclosure;

FIG. 15 is an example flow diagram illustrating an example method of determining whether to cause the execution subsystem associated with the object depalletization system to exit the constant pallet mode in accordance with various embodiments of the present disclosure;

FIG. 16A and FIG. 16B are example flow diagrams illustrating an example method of determining whether the execution subsystem associated with the object depalletization system should continue operating in the constant pallet mode in accordance with various embodiments of the present disclosure; and FIG. 17 is an example flow diagram illustrating an example method associated with an object depalletization system in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

In environments such as distribution centers, warehouses, and/or the like, objects may be conveyed on a pallet, and one or more robotic depalletizer devices may be utilized to depalletize objects (e.g. boxes, articles, products) from a stack on the pallet.

In some embodiments, the objects in the stack are of a single, same stock keeping unit (SKU), which indicates that all the objects in the stack are of the same type (e.g. having the same sizes and shapes). In such examples, an example depalletization system may only need to detect the position of the object to depalletize the object, as the sizes and shapes can be determined/known by the example depalletization system based on the same SKU.

In some embodiments, at least some of the objects in the stack are of mixed, different SKUs, which indicates that the objects in the stack are of different types (e.g. having different sizes and/or shapes). In such example, an example depalletization system may rely on vision system (such as a perception subsystem) to determine the size and/or the shape of the objects so that the depalletizer device can depalletize the objects from the pallet (for example, calculate the pose of the depalletizer device based at least in part on the size and/or the shape of the objects).

While most such perception systems rely on machine learning models for this time-expensive operation, one of the main bottlenecks of the depalletization system is the perception operation. For example, in the mixed SKU scenario, many depalletization systems need to utilize the vision system (and the machine learning model) to determine the size and shape for each object in order to determine the poses of the depalletizer device in depalletizing the object, therefore causing significant time constraint and reducing operational efficiency.

For example, many perception systems of depalletizing robots relies on machine learning models to determine the size of and shape of the product with the robot pose, which is an expensive and a time consuming process as the perception system detects the product's position, the size and shape of each product during the depalletizing operation. In contrast, various embodiments of the present disclosure overcome these technical challenges and difficulties. For example, various embodiments of the present disclosure provide a depalletizing robot operating in a constant pallet mode. Based on the image(s) received from the vision system, when the control subsystem determines that the items on the top layer of the pallet are of similar dimensions, the depalletizer device is switched to constant pallet mode. In this mode, the control subsystem uses the same settings, speed profile, etc. for the depalletizer device as long as the depalletizer device is in constant pallet mode. Further, no new images are provided in the constant pallet mode. When the vision system sends new image(s) indicating that the next items to be picked are not of similar dimensions, the control subsystem causes the depalletizer device to switch out of constant pallet mode and begins operating in its default mode.

Various embodiments of the present disclosure overcome the above-referenced technical challenges and difficulties, and provide various technical benefits and advantages.

For example, continuing from the mixed SKU scenario, some of the products may be of same or similar shape and sizes despite having different SKUs. For example, in an example mixed SKU scenario, a first object, a second object, and a third object are disposed on a pallet. While the first object, the second object, and the third object may have different SKUs and different sizes and/or shapes, the differences in sizes and/or shapes may be within a tolerable range. In such an example, the depalletization system can decrease the time of operation by reducing the time of triggering the perception system to capture image data for similar products. For example, the depalletization system can trigger the perception system once, and decide on the pick poses of the depalletizer device (for example, the lift height of the depalletizer device) for all the products having similar sizes, and can pick them incrementally.

As such, various embodiments of the present disclosure provide defined, proven solutions for increasing productivity and production rate of depalletization systems. For example, solutions in accordance with embodiments of the present disclosure can be implemented in multiple packet picking systems where the system tries to unload mixed SKU products. As a result, an example depalletization system in accordance with embodiments of the present disclosure can provide an unified solution to multiple problems, and can drastically reduce the cycle time of operation.

In various embodiments of the present disclosure, the depalletization system is highly dependent on the perception system as the perception system detects the size and pose of the objects/packages/products.

In some embodiments, the perception system first detects all fully visible object/package/product segments on the top layer of the pallet using a machine learning segmentation model. Then, a control subsystem computes the length, width and height of each object/package/product from the pallet base. Later, the control subsystem compares the mentioned attributes of all visible objects/packages/products on the layer and, if all of them lie within a certain threshold range, then a constant pallet mode is triggered, which identifies that all the products on the visible layer are of the same attributes.

In some embodiments, the mean package height from the pallet base for the current detected constant pallet is stored. For any succeeding constant pallet detection, its mean package height is compared with the stored value. If it is different enough by a certain tolerance range, then that pallet scenario is again determined as constant pallet mode and the stored value is updated to this current scene's mean package height.

In some embodiments, after the perception system sends a signal of detection for constant pallet mode with all the grasp points for the depalletizer device on one pallet layer, the system stores all the grasp poses of the depalletizer device and tries to execute the grasp incrementally. In some embodiments, while picking up the first object, the depalletization system measures the height of the product with a laser based hardware, and the rest of the objects/packages/products in the stored grasps are lifted to this determined height. In some embodiments, the perception subsystem triggers the perception again for a new perception output when the constant pallet mode ends.

In some embodiments, the two main conditions for the depalletizer device to exit the constant pallet mode are (1) if all the grasps are executed by the depalletizer device, and/or (2) if the current boxes detected height is not within a defined threshold (more or less than the defined threshold) of the first box height.

Figure 1A:
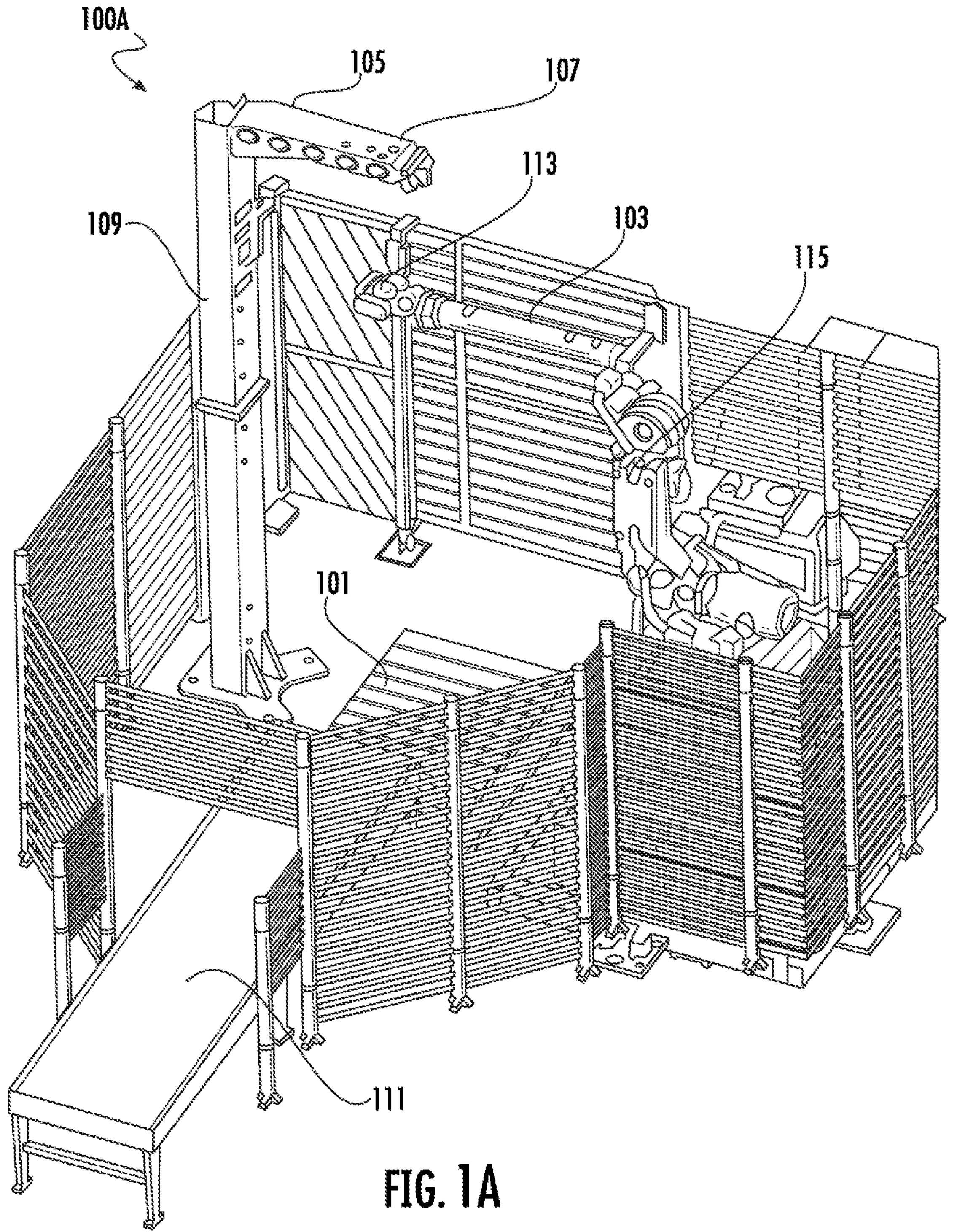
FIG. 1A is an example perspective view of an example depalletization system that can be used in accordance with various embodiments of the present disclosure.

FIG. 1A is an example perspective view of an example depalletization system 100A that can be used in accordance with various embodiments of the present disclosure.

In the example shown in FIG. 1A, the example depalletization system 100A comprises a depalletizer device 103. In some embodiments, the depalletizer device 103 is part of an execution sub system of the depalletization system 100A.

In the example shown in FIG. 1A, the depalletizer device 103 may be in the form of a robotic depalletizer. For example, the depalletizer device 103 may comprise an end effector 113 and a robotic arm 115 connected to the end effector 113. In some embodiments, the depalletizer device 103 may comprise one or more controller, sensors, and/or drives to cause and control operations of the end effector 113 and/or the robotic arm 115.

In some embodiments, the depalletizer device 103 is positioned adjacent to a pallet 101. In some embodiments, to depalletize an object from the pallet 101, one or more grasp poses and grasp points are calculated for the depalletizer device 103. For example, the robotic arm 115 may be moved and/or rotated so that the end effector 113 can be positioned on an object from the pallet 101. In some embodiments, the end effector 113 may retrieve and/or grasp the object (for example, through suction mechanism, and/or the like), and the robotic arm 115 may be moved so as to lift the object to a lift height (and the height of the end effector 113 is referred to as a grasp pose height). Subsequent to lifting the object, the robotic arm 115 may be moved and/or rotated so that the object that is grasped by the end effector 113 is positioned above the conveyor 111. Subsequently, the end effector 113 releases the object onto the conveyor 111, thereby completing the operation of depalletizing the object from the pallet 101 onto the conveyor 111.

As described above, a depalletization system may rely on a perception subsystem to capture data related to the objects such that the grasp poses and grasp points of the depalletizer device can be determined. Referring now to the examples shown in FIG. 1A, the example depalletization system 100A comprises a vision structure 105. In some embodiments, the vision structure 105 is part of a perception subsystem of the depalletization system 100A.

In some embodiments, the vision structure 105 is positioned adjacent to the pallet 101. For example, the vision structure 105 comprises a vertical beam 109 that is connected to a horizontal beam 107. In some embodiments, one or more image capture devices may be disposed on the horizontal beam 107 and/or the vertical beam 109.

For example, a 2-D image capture device may be disposed near an end of the horizontal beam 107 and facing the pallet 101 so as to capture a 2-D image that is a top view of the pallet 101 (e.g. showing objects on the top pallet layer). Examples of 2-D image capture devices may include, but are not limited to, cameras, 2-D image sensors, and/or the like.

In some embodiments, the 2-D image may be used to determine a width and/or a length of the object.

Additionally, or alternatively, a 3-D image capture device may be disposed on the horizontal beam 107 and facing the pallet 101 so as to capture a 3-D image of the pallet 101. In some embodiments, the 3-D image capture device may be disposed moveably along the vertical beam 109 and/or the horizontal beam 107. Examples of 3-D image capture devices may include, but are not limited to, time-of-flight image sensors, stereoscopic imaging sensors, and/or the like. In some embodiments, the 3-D image may be used to determine a width and/or a height of the object.

In some embodiments, a height sensing device may be disposed at the end of the conveyor 111 adjacent to the pallet 101. In some embodiments, the height sensing device may be part of the depalletization system 100A and is configured to sense height data, details of which are described herein. Examples of height sensing devices include, but are not limited to, LiDAR sensors and/or the like.

Figure 1B:
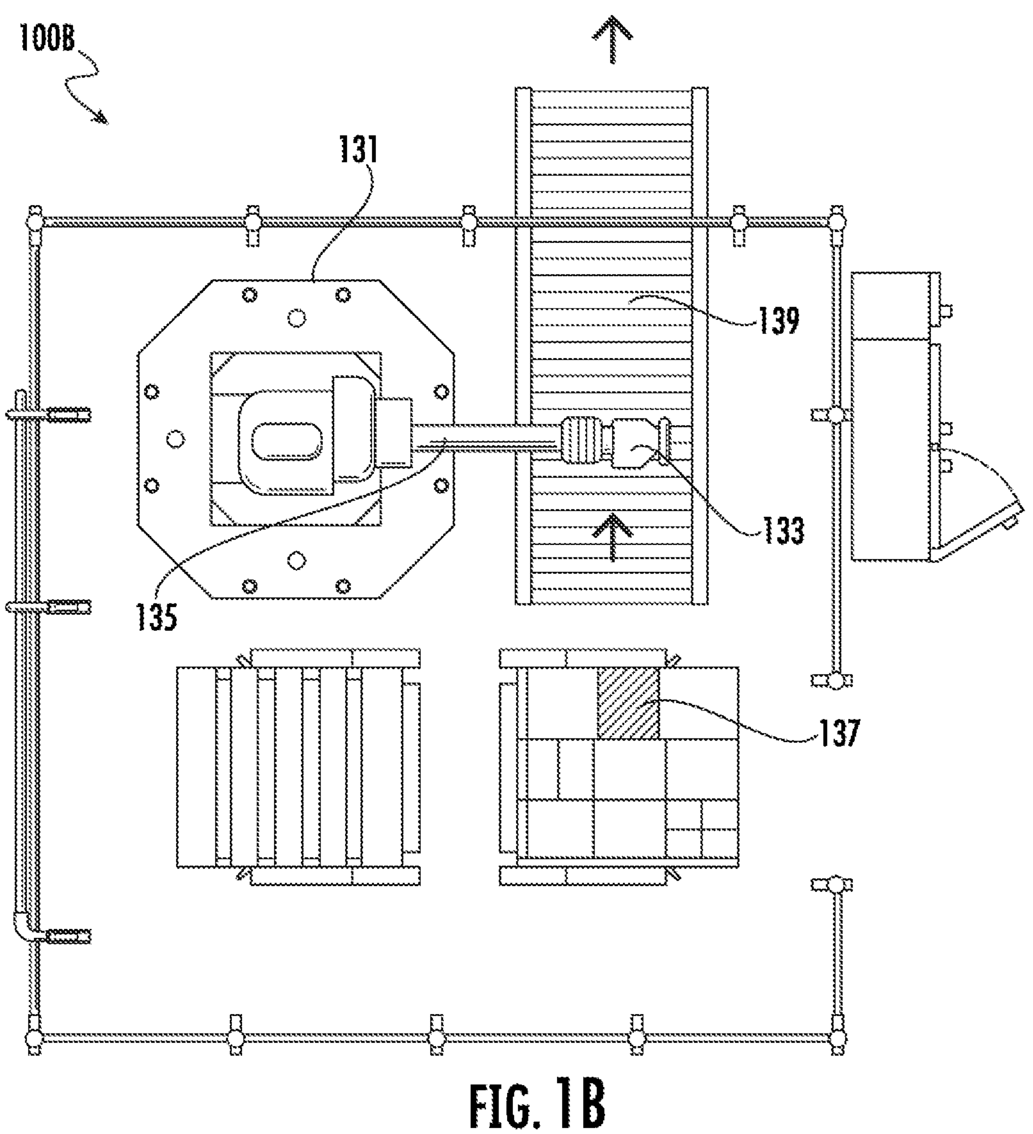
FIG. 1B is an example diagram illustrating an example depalletization system that can be used in accordance with various embodiments of the present disclosure.

FIG. 1B is an example diagram illustrating an example depalletization system 100B that can be used in accordance with various embodiments of the present disclosure.

In the example shown in FIG. 1B, the example depalletization system 100B comprises a depalletizer device 131 that includes an end effector 133 connected to a robotic arm 135. In some embodiments, the end effector 133 may depalletize objects from the pallet 137 onto the conveyor 139, similar to those described above in connection with FIG. 1A.

Figure 2:
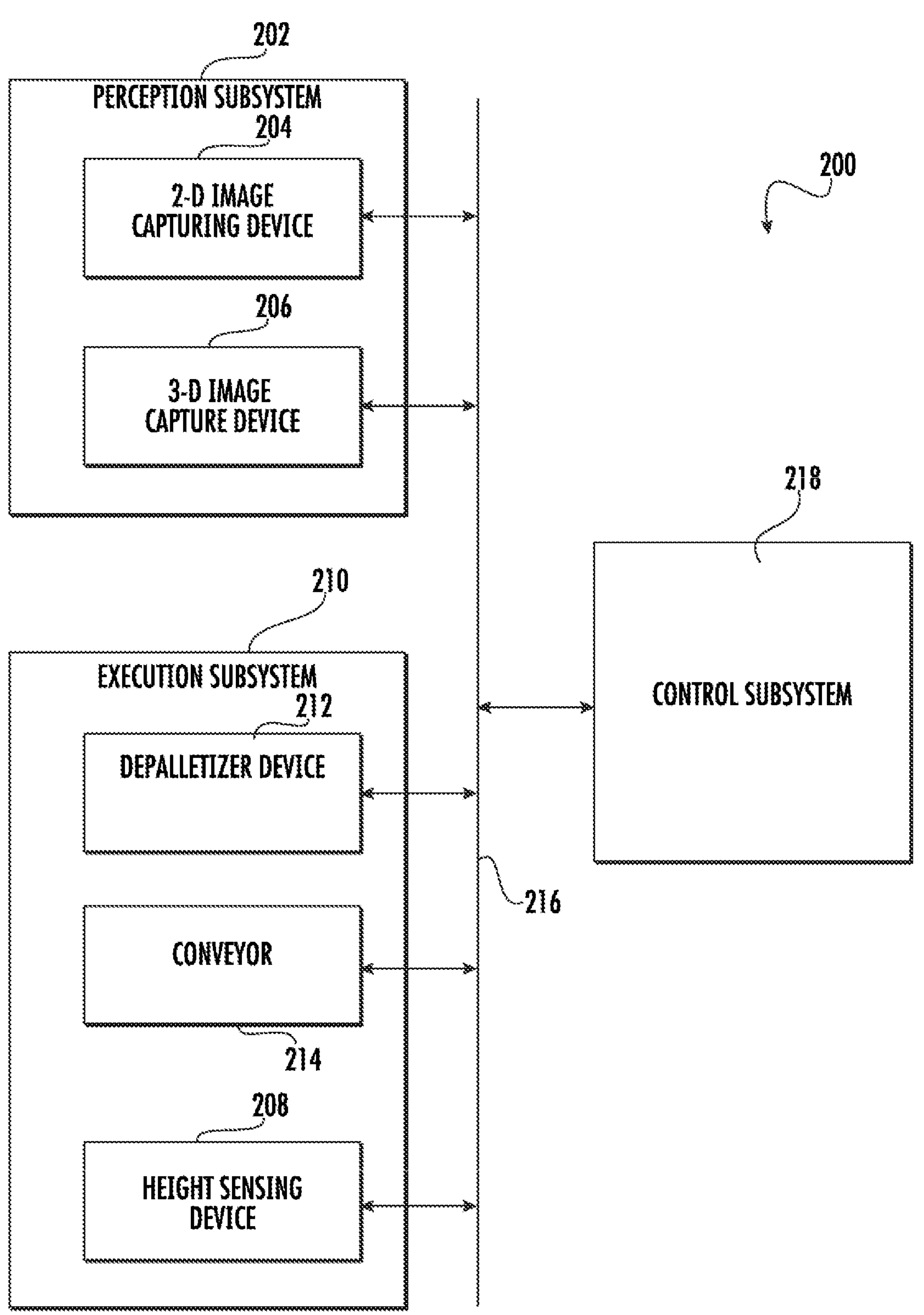
FIG. 2 is an example schematic representation of example components in an example depalletization system in accordance with various embodiments of the present disclosure.

FIG. 2 is an example schematic representation of example components in an example depalletization system 200 in accordance with various embodiments of the present disclosure. In particular, FIG. 2 illustrates example data communications between various components of the example depalletization system 200.

In the example shown in FIG. 2, the example depalletization system 200 comprises a perception subsystem 202, an execution subsystem 210, and a control subsystem 218 that can exchange data and/or information via the system bus 216.

In some embodiments, the perception subsystem may generate imaging data and transmit the imaging data to the control subsystem 218 via the system bus 216. In particular, the perception subsystem 202 may comprise a 2-D image capturing device 204 (similar to the 2-D image capturing device described above in connection with at least FIG. 1A). In some embodiments, the 2-D image capturing device 204 may generate 2-D image data and transmit the 2-D image data to the control subsystem 218 via the system bus 216. Additionally, or alternatively, the perception subsystem 202 may comprise a 3-D image capturing device 206 (similar to the 3-D image capturing device described above in connection with at least FIG. 1A). In some embodiments, the 3-D image capturing device 206 may generate 3-D image data and transmit the 3-D image data to the control subsystem 218 via the system bus 216.

In some embodiments, the control subsystem 218 may transmit control instructions to the execution subsystem 210 via the system bus 216 so as to control the operations associated with the devices of execution subsystem 210.

In some embodiments, the execution subsystem 210 may comprise a height sensing device 208. In some embodiments, the height sensing device 208 may generate height data and transmit the height data to the control subsystem 218.

For example, the execution subsystem 210 may comprise a depalletizer device 212. In such an example, the control subsystem 218 may transmit control instructions to the depalletizer device 212 so as to control the operations of the depalletizer device 212 and/or cause the depalletizer device 212 to operate in a certain way, details of which are described herein.

Additionally, or alternatively, the execution subsystem 210 may comprise a conveyor 214. In such an example, the control subsystem 218 may transmit control instructions to the conveyor 214 so as to control the operations of the conveyor 214 and/or cause the conveyor 214 to operate in a certain way.

In some embodiments, the system bus 216 may be in various forms. For example, the system bus 216 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system bus 216 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The control subsystem 218 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Figure 3:
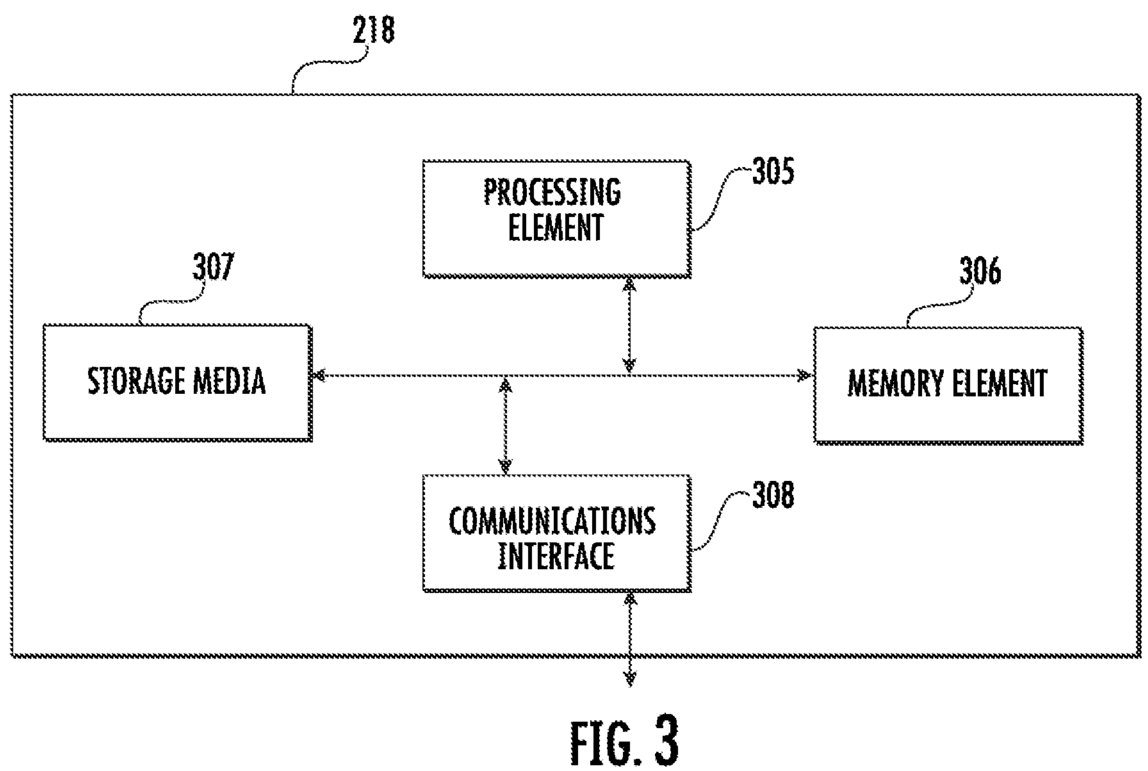
FIG. 3 is a schematic representation of example components in an example control subsystem in accordance with various embodiments of the present disclosure.

FIG. 3 provides a schematic diagram of a control subsystem 218 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the control subsystem 218 may also include one or more network and/or communications interface 308 for communicating with various computing entities, such as by communicating data, content, information, and/or similar terms used herein that can be transmitted, received, operated on, processed, displayed, stored, and/or the like. For instance, the control subsystem 218 may communicate with other components of the depalletization system.

As shown in FIG. 3, in one embodiment, the control subsystem 218 may include or be in communication with one or more processing elements (for example, processing element 305) (also referred to as processors, processing circuitry, and/or similar terms used herein interchangeably) that communicate with other elements within the control subsystem 218 via a bus, for example, or network connection. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the control subsystem 218 may further include or be in communication with volatile media (also referred to as volatile storage, memory, memory storage, memory circuitry and/or similar terms used herein interchangeably). In one embodiment, the volatile storage or memory may also include one or more memory element 306 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 306 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the control subsystem 218 with the assistance of the processing element 305 and operating system.

In one embodiment, the control subsystem 218 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 307 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 307 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Storage media 307 may also be embodied as a data storage device or devices, as a separate database server or servers, or as a combination of data storage devices and separate database servers. Further, in some embodiments, storage media 307 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, storage media 307 may encompass one or more data stores configured to store information/data usable in certain embodiments.

As indicated, in one embodiment, the control subsystem 218 may also include one or more network and/or communications interface 308 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the control subsystem 218 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The control subsystem 218 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

FIG. 4, FIG. 5, and FIG. 6 are example diagrams illustrating example objects on example pallets in accordance with various embodiments of the present disclosure. In particular, FIG. 4 illustrates an example pallet where objects have the same SKUs. FIG. 5 and FIG. 6 illustrate example pallets where objects have the different SKUs.

In the example diagram 400 shown in FIG. 4, the objects are stacked on the example pallet 402 into pallet layers, such as the pallet layer 404A, the pallet layer 404B, the pallet layer 404C, and the pallet layer 404D. Each of the pallet layers may comprise one or more objects. In the example shown in FIG. 4, the objects in each pallet layer may have the same SKU (e.g. have the same sizes and the same shapes) or may have similar sizes and shapes, and objects in different pallet layers have the same SKU (e.g. have the same sizes and the same shapes) or may have similar sizes and shapes. As such, the example diagram 400 shown in FIG. 4 illustrates an example same SKU scenario. In some embodiments, the control subsystem may cause the execution subsystem to operation in a constant pallet mode when depalletizing objects from each of the pallet layer 404A, the pallet layer 404B, the pallet layer 404C, and the pallet layer 404D, details of which are described herein.

In the example diagram 500 shown in FIG. 5, the objects are stacked on the example pallet 501 into pallet layers, such as the pallet layer 503A, the pallet layer 503B, the pallet layer 503C, and the pallet layer 503D. Each of the pallet layers may comprise one or more objects. In the example shown in FIG. 5, the objects in each pallet layer may have the same SKU (e.g. have the same sizes and the same shapes) or may have similar sizes and shapes, but objects in different pallet layers may have different SKU (e.g. have different sizes and different shapes). As such, the example diagram 500 shown in FIG. 5 illustrates an example mixed SKU scenario. In some embodiments, the control subsystem may cause the execution subsystem to operation in a constant pallet mode when depalletizing objects from each of the pallet layer 503A, the pallet layer 503B, the pallet layer 503C, and the pallet layer 503D, details of which are described herein.

In the example diagram 600 shown in FIG. 6, the objects are stacked on the example pallet 602 into pallet layers, such as the pallet layer 604A, the pallet layer 604B, and the pallet layer 604C. Each of the pallet layers may comprise one or more objects. In the example shown in FIG. 6, the objects in each pallet layer may have the different SKU (e.g. have different sizes and/or different shapes), and objects in different pallet layers may have different SKU (e.g. have different sizes and/or different shapes). As such, the example diagram 600 shown in FIG. 6 illustrates an example mixed SKU scenario. In some embodiments, the control subsystem may cause the execution subsystem to operate in a mode other than a constant pallet mode.

FIG. 7A and FIG. 7B are example flow diagrams illustrating an example method 700 of determining whether to cause an execution subsystem associated with the object depalletization system to operate in a constant pallet mode in accordance with various embodiments of the present disclosure.

As shown in FIG. 7A, the example method 700 starts at step/operation 701. Subsequent to and/or in response to step/operation 701, the example method 700 proceeds to step/operation 703. At step/operation 703, a processing element (such as, but not limited to, the processing element 305 of the control subsystem 218 of an example depalletization system described above in connection with at least FIG. 1A to FIG. 3) may receive, from a perception subsystem associated with an object depalletization system, first imaging data associated with a plurality of objects disposed on a pallet.

For example, the first imaging data may be a 2-D image data that is captured by a 2-D image capturing device of the perception subsystem (similar to those described above in connection with at least FIG. 1A). Additionally, or alternatively, the first imaging data may be a 3-D image data that is captured by a 3-D image capturing device of the perception subsystem (similar to those described above in connection with at least FIG. 1A).

In some embodiments, the 2-D image capturing device and/or the 3-D image capturing device may be positioned on top of the pallet, and the first imaging data may provide a view of a top, visible pallet layer of a pallet that comprises objects to be depalletized. An example image based on the first image data is illustrated and described in connection with FIG. 9.

Subsequent to and/or in response to step/operation 703, the example method 700 proceeds to step/operation 705. At step/operation 705, a processing element (such as, but not limited to, the processing element 305 of the control subsystem 218 of an example depalletization system described above in connection with at least FIG. 1A to FIG. 3) may calculate, based at least in part on the first imaging data, one or more comparative dimension measures associated with the plurality of objects.

In some embodiments, based on the first imaging data, the processing element may calculate a number of pixels the length, width, and/or height of each object (for example, in the 2-D image and/or in the 3-D image). To calculate a comparative dimension measure between two objects, the processing element may calculate a difference between the pixel number of the length of one object and the pixel number of the length of another object, calculate a difference between the pixel number of the width of one object and the pixel number of the width of another object, and/or calculate a difference between the pixel number of the height of one object and the pixel number of the height of another object.

In some embodiments, the processing element may calculate comparative dimension measures between each two objects on the top pallet layer so as to calculate the one or more comparative dimension measures associated with the plurality of objects at step/operation 705.

Subsequent to and/or in response to step/operation 705, the example method 700 proceeds to block A, which connects FIG. 7A to FIG. 7B. Referring now to FIG. 7B, subsequent to and/or in response to step/operation 705, the example method 700 proceeds step/operation 707. At step/operation 707, a processing element (such as, but not limited to, the processing element 305 of the control subsystem 218 of an example depalletization system described above in connection with at least FIG. 1A to FIG. 3) may determine whether one or more comparative dimension measures satisfy a comparative dimension threshold range. For example, the processing element may determine whether each of the one or more comparative dimension measures are within the comparative dimension threshold range.

As an example, if the comparative dimension measure between two objects is 2, and the comparative dimension threshold range is 4, the comparative dimension measure satisfies the comparative dimension threshold. As another example, if the comparative dimension measure between two objects is 4, and the comparative dimension threshold range is 2, the comparative dimension measure does not satisfy the comparative dimension threshold In some embodiments, the comparative dimension threshold range corresponds to a tolerance of the system in determining whether two objects are considered to be sufficiently similar in size and/or shape.

If, at step/operation 707, the processing element determines that one or more comparative dimension measures satisfy a comparative dimension threshold range, the example method 700 proceeds to step/operation 709. At step/operation 709, a processing element (such as, but not limited to, the processing element 305 of the control subsystem 218 of an example depalletization system described above in connection with at least FIG. 1A to FIG. 3) may cause an execution subsystem associated with the object depalletization system to operate in a constant pallet mode in response to determining that the one or more comparative dimension measures satisfy the comparative dimension threshold range.

For example, as described above, the processing element computes the length, width and height of each object/package/product from the pallet base and compares the mentioned attributes of all visible objects/packages/products on the layer. If all of them lie within a certain threshold range, the processing element identifies that all the objects on the visible layer are of the same attributes and triggers a constant pallet mode for the execution subsystem.

As such, the processing element triggers the constant pallet mode once it determines that the objects on a pallet layer are sufficiently similar in sizes and shapes.

Referring back to FIG. 7B, if, at step/operation 707, the processing element determines that one or more comparative dimension measures do not satisfy a comparative dimension threshold range, the example method 700 proceeds to step/operation 711. At step/operation 711, a processing element (such as, but not limited to, the processing element 305 of the control subsystem 218 of an example depalletization system described above in connection with at least FIG. 1A to FIG. 3) may cause an execution subsystem associated with the object depalletization system to operate in a mode other than the constant pallet mode in response to determining that the one or more comparative dimension measures does not satisfy the comparative dimension threshold range.

For example, if a comparative dimension measure indicates that the size difference (e.g. length, width, and/or height) between one of the objects on the top, visual layer and another object on the top, visible layer does not satisfy the comparative dimension threshold range, the processing element determines that the objects are not sufficiently similar in sizes and shapes, and may cause an execution subsystem associated with the object depalletization system to operate in a mode other than the constant pallet mode (for example, in the default mode).

Referring back to FIG. 7B, subsequent to and/or in response to step/operation 709 and/or step/operation 711, the example method 700 proceeds to step/operation 713 and ends.

FIG. 8 is an example flow diagram illustrating an example method 800 of generating object segmentation indications in accordance with various embodiments of the present disclosure.

As shown in FIG. 8, the example method 800 starts at step/operation 802. Subsequent to and/or in response to step/operation 802, the example method 800 proceeds to step/operation 804. At step/operation 804, a processing element (such as, but not limited to, the processing element 305 of the control subsystem 218 of an example depalletization system described above in connection with at least FIG. 1A to FIG. 3) may receive 2-D image data associated with the plurality of objects and captured by the 2-D image capturing device.

In some embodiments, the perception subsystem comprises a 2-D image capturing device. In some embodiments, the first imaging data (for example, those described above in connection with FIG. 7A and FIG. 7B) comprises 2-D image data associated with the plurality of objects on a top pallet layer and captured by the 2-D image capturing device.

Subsequent to and/or in response to step/operation 804, the example method 800 proceeds to step/operation 808. At step/operation 808, a processing element (such as, but not limited to, the processing element 305 of the control subsystem 218 of an example depalletization system described above in connection with at least FIG. 1A to FIG. 3) may input at least the 2-D image data to an object segmentation machine learning model.

In some embodiments, the processing element may input the imaging data (such as the first imaging data described above in connection with at least FIG. 7A and FIG. 7B) to an object segmentation machine learning model prior to calculating the one or more comparative dimension measures associated with the plurality of objects (for example, similar to the step/operation 705 described above in connection with at least FIG. 7A). As described above, the first imaging data comprises at least one of 2-D image data associated with the plurality of objects on a top pallet layer.

In some embodiments, the object segmentation machine learning model is a machine learning model that is trained to identify/segment different objects in the 2-D image data. Examples of object segmentation machine learning models may include, but are not limited to, image classification models, artificial neural networks, and/or the like.

Subsequent to and/or in response to step/operation 808, the example method 800 proceeds to step/operation 810. At step/operation 810, a processing element (such as, but not limited to, the processing element 305 of the control subsystem 218 of an example depalletization system described above in connection with at least FIG. 1A to FIG. 3) may receive a plurality of object segmentation indications from the object segmentation machine learning model.

In some embodiments, the plurality of object segmentation indications are associated with the at least one of 2-D image data. For example, the object segmentation machine learning models may identify/segment different objects from the 2-D image data, and may generate an object segmentation indication for each of the objects that is identified. An example 2-D image with object segmentation indications are illustrated and described in connection with at least FIG. 9.

In some embodiments, calculating the one or more comparative dimension measures (for example, similar to those described above in connection with at least step/operation 705 of FIG. 7A) is based at least in part on the plurality of object segmentation indications. For example, the processing element may first identify all the objects in the image data based at least in part on the object segmentation indications, and then calculate comparative dimension measures, similar to those described herein.

Referring back to FIG. 8, subsequent to and/or in response to step/operation 810, the example method 800 proceeds to step/operation 812 and ends.

FIG. 9 is an example image illustrating example object segmentation indications in accordance with various embodiments of the present disclosure.

FIG. 9 illustrates an example 2-D image 901 that shows objects on a top, visible layer of the pallet. FIG. 9 also illustrates a height sensing device 905 that is disposed on an edge of the conveyor.

Similar to those described above in connection with FIG. 8, the processing element may provide the 2-D image 901 to an object segmentation machine learning model. The object segmentation machine learning model is a machine learning model that is trained to identify/segment different objects in the 2-D image data or the 3-D image data. In the example shown in FIG. 9, the object segmentation machine learning model may generate one or more object segmentation indications (such as the object segmentation indication 903A, the object segmentation indication 903B, and the object segmentation indication 903C) that correspond to the one or more objects on the top, visible layer of the pallet as captured by the 2-D image.

In some embodiments, each of the object segmentation indications indicates a length edge, a width edge, and/or a height edge associated with an object. For example, in the example shown in FIG. 9, one or more object segmentation indications (such as the object segmentation indication 903A, the object segmentation indication 903B, and the object segmentation indication 903C) may be in the shape of rectangle boxes that mark the length edge and the width edge of the object.

As described above, calculating the one or more comparative dimension measures (for example, similar to those described above in connection with at least step/operation 705 of FIG. 7A) is based at least in part on the plurality of object segmentation indications. For example, the processing element may utilize the length edge, the width edge, and/or the height edge associated with an object as indicated by an object segmentation indication to calculate the one or more comparative dimension measures, details of which are described herein.

FIG. 10 is an example flow diagram illustrating an example method 1000 of determining a comparative dimension measure in accordance with various embodiments of the present disclosure. In some embodiments, example steps/operations shown in FIG. 10 may be implemented as a part of calculating the one or more comparative dimension measures associated with the plurality of objects (for example, in connection with at least step/operation 705 of FIG. 7A). For example, the plurality of objects disposed on the pallet comprise a first object and a second object that are disposed on a same pallet layer of the pallet (e.g. the top, visible layer as captured by a 2-D image data and/or a 3-D image data).

As shown in FIG. 10, the example method 1000 starts at step/operation 1002. Subsequent to and/or in response to step/operation 1002, the example method 1000 proceeds to step/operation 1004. At step/operation 1004, a processing element (such as, but not limited to, the processing element 305 of the control subsystem 218 of an example depalletization system described above in connection with at least FIG. 1A to FIG. 3) may determine a first image-dimension measure associated with the first object.

In some embodiments, the processing element determines the first image-dimension measure associated with the first object based at least in part on 2-D image data or 3-D image data from the perception subsystem.

For example, based on the object segmentation indication that is generated by an object segmentation machine learning model (for example, based at least in part on FIG. 8 and FIG. 9 described above), the processing element may determine a length edge, a width edge, and/or a height edge of the first object. Based on the 2-D image data or 3-D image data, the processing element may calculate a number of pixels along the length edge, the width edge, and/or the height edge of the first object as the first image-dimension measure.

In some embodiments, the processing element may provide the 2-D image data or 3-D image data to one or more machine learning models that are trained to generate image-dimension measures.

Referring back to FIG. 10, subsequent to and/or in response to step/operation 1002, the example method 1000 proceeds to step/operation 1006. At step/operation 1006, a processing element (such as, but not limited to, the processing element 305 of the control subsystem 218 of an example depalletization system described above in connection with at least FIG. 1A to FIG. 3) may determine a second image-dimension measure associated with the second object.

In some embodiments, the processing element determines a second image-dimension measure associated with the second object based at least in part on the 2-D image data or the 3-D image data from the perception subsystem.

For example, based on the object segmentation indication that is generated by an object segmentation machine learning model (for example, based at least in part on FIG. 8 and FIG. 9 described above), the processing element may determine a length edge, a width edge, and/or a height edge of the second object. Based on the 2-D image data or 3-D image data, the processing element may calculate a number of pixels along the length edge, the width edge, and/or the height edge of the second object as the second image-dimension measure.

In some embodiments, the processing element may provide the 2-D image data or 3-D image data to one or more machine learning models that are trained to generate image-dimension measures.

Referring back to FIG. 10, subsequent to and/or in response to step/operation 1004 and/or step/operation 1006, the example method 1000 proceeds to step/operation 1008. At step/operation 1008, a processing element (such as, but not limited to, the processing element 305 of the control subsystem 218 of an example depalletization system described above in connection with at least FIG. 1A to FIG. 3) may determine a comparative dimension measure based at least in part on the first image-dimension measure and the second image-dimension measure.

In some embodiments, the processing element determines a comparative dimension measure of the one or more comparative dimension measures based at least in part on the first image-dimension measure and the second image-dimension measure.

Continuing from the example above, the processing element may calculate a difference in the number of pixels between the number of pixels along the length edge and the width edge of the first object (e.g. the first image-dimension measure) and the number of pixels along the length edge and the width edge of the second object (e.g. the second image-dimension measure).

In some embodiments, the height of the first object (e.g. the first image-dimension measure) and the height of the second object (e.g. the second image-dimension measure) may be calculated based on a point cloud from a 3-D image capturing device.

In some embodiments, subsequent to determining the comparative dimension measure, the processing element may compare the comparative dimension measure with a comparative dimension threshold range, similar to the various examples described herein.

Referring back to FIG. 10, subsequent to and/or in response to step/operation 1008, the example method 1000 proceeds to step/operation 1010 and ends.

FIG. 11A and FIG. 11B are example flow diagrams illustrating an example method 1100 of determining whether one or more comparative dimension measures satisfy a comparative dimension threshold range in accordance with various embodiments of the present disclosure.

As shown in FIG. 11A, the example method 1100 starts at step/operation 1101. Subsequent to and/or in response to step/operation 1101, the example method 1100 proceeds to step/operation 1103. At step/operation 1103, a processing element (such as, but not limited to, the processing element 305 of the control subsystem 218 of an example depalletization system described above in connection with at least FIG. 1A to FIG. 3) may calculate a comparative length measure.

In some embodiments, the processing element may calculate a first image-dimension measure associated with the first object, similar to those described above in connection with at least step/operation 1004 of FIG. 10. In some embodiments, the first image-dimension measure associated with the first object is a first image length measure associated with the first object.

In some embodiments, the processing element may calculate a second image-dimension measure associated with the second object, similar to those described above in connection with at least step/operation 1006 of FIG. 10. In some embodiments, the second image-dimension measure associated with the second object is a second image length measure associated with the second object.

In some embodiments, the processing element calculates the comparative dimension measure in the form of a comparative length measure based on the first image length measure and the second image length measure. For example, the processing element calculates a difference between the first image length measure and the second image length measure as the comparative length measure. In some embodiments, the difference corresponds to a difference in the lengths of the objects.

Referring back to FIG. 11A, subsequent to and/or in response to step/operation 1103, the example method 1100 proceeds to step/operation 1105. At step/operation 1105, a processing element (such as, but not limited to, the processing element 305 of the control subsystem 218 of an example depalletization system described above in connection with at least FIG. 1A to FIG. 3) may determine whether the comparative length measure satisfies a comparative length threshold range.

As described above in connection with at least step/operation 707 of FIG. 7B, the processing element determines whether one or more comparative dimension measures satisfy a comparative dimension threshold range. In the example shown at step/operation 1105 of FIG. 11A, the comparative dimension threshold range is a comparative length threshold range.

If, at step/operation 1105, the processing element determines that the comparative length measure does not satisfy comparative length threshold range, the example method 1100 proceeds to step/operation 1107. At step/operation 1107, a processing element (such as, but not limited to, the processing element 305 of the control subsystem 218 of an example depalletization system described above in connection with at least FIG. 1A to FIG. 3) may cause an execution subsystem associated with the object depalletization system to operate in a mode other than the constant pallet mode (for example, in the default mode).

Subsequent to and/or in response to step/operation 1107, the example method 1100 proceeds to step/operation 1109 and ends.

If, at step/operation 1105, the processing element determines that the comparative length measure satisfies the comparative length threshold range, the example method 1100 proceeds to step/operation 1111. At step/operation 1111, a processing element (such as, but not limited to, the processing element 305 of the control subsystem 218 of an example depalletization system described above in connection with at least FIG. 1A to FIG. 3) may calculate a comparative width measure.

In some embodiments, the processing element may calculate a first image-dimension measure associated with the first object, similar to those described above in connection with at least step/operation 1004 of FIG. 10. In some embodiments, the first image-dimension measure associated with the first object is a first image width measure associated with the first object.

In some embodiments, the processing element may calculate a second image-dimension measure associated with the second object, similar to those described above in connection with at least step/operation 1006 of FIG. 10. In some embodiments, the second image-dimension measure associated with the second object is a second image width measure associated with the second object.

In some embodiments, the processing element calculates the comparative dimension measure in the form of a comparative width measure based on the first image width measure and the second image width measure. For example, the processing element calculates a difference between the first image width measure and the second image width measure as the comparative width measure. In some embodiments, the difference corresponds to a difference in the widths of the objects.

Referring back to FIG. 11A, subsequent to and/or in response to step/operation 1111, the example method 1100 proceeds to block A, which connects FIG. 11A to FIG. 11B. Referring now to FIG. 11B, subsequent to and/or in response to step/operation 1111, the example method 1100 proceeds step/operation 1113. At step/operation 1113, a processing element (such as, but not limited to, the processing element 305 of the control subsystem 218 of an example depalletization system described above in connection with at least FIG. 1A to FIG. 3) may determine whether the comparative width measure satisfies the comparative width threshold range.

As described above in connection with at least step/operation 707 of FIG. 7B, the processing element determines whether one or more comparative dimension measures satisfy a comparative dimension threshold range. In the example shown at step/operation 1113 of FIG. 11B, the comparative dimension threshold range is a comparative width threshold range.

If, at step/operation 1113, the processing element determines that comparative width measure does not satisfy the comparative width threshold range, the example method 1100 proceeds to step/operation 1115. At step/operation 1115, a processing element (such as, but not limited to, the processing element 305 of the control subsystem 218 of an example depalletization system described above in connection with at least FIG. 1A to FIG. 3) may cause an execution subsystem associated with the object depalletization system to operate in a mode other than the constant pallet mode (for example, in the default mode).

Subsequent to and/or in response to step/operation 1115, the example method 1100 proceeds to step/operation 1117 and ends.

If, at step/operation 1113, the processing element determines that comparative width measure satisfies the comparative width threshold range, the example method 1100 proceeds to step/operation 1119. At step/operation 1119, a processing element (such as, but not limited to, the processing element 305 of the control subsystem 218 of an example depalletization system described above in connection with at least FIG. 1A to FIG. 3) may calculate a comparative height measure.

In some embodiments, the processing element may calculate a first image-dimension measure associated with the first object, similar to those described above in connection with at least step/operation 1004 of FIG. 10. In some embodiments, the first image-dimension measure associated with the first object is a first image height measure associated with the first object. In some embodiments, the first image height measure is calculated based on a point cloud from a 3-D image capturing device.

In some embodiments, the processing element may calculate a second image-dimension measure associated with the second object, similar to those described above in connection with at least step/operation 1006 of FIG. 10. In some embodiments, the second image-dimension measure associated with the second object is a second image height measure associated with the second object. In some embodiments, the second image height measure is calculated based on a point cloud from a 3-D image capturing device.

In some embodiments, the processing element calculates the comparative dimension measure in the form of a comparative height measure based on the first image height measure and the second image height measure. For example, the processing element calculates a difference between the first image height measure and the second image height measure as the comparative height measure. In some embodiments, the difference corresponds to a difference in the heights of the objects.

Referring back to FIG. 11B, subsequent to and/or in response to step/operation 1119, the example method 1100 proceeds to step/operation 1121. At step/operation 1121, a processing element (such as, but not limited to, the processing element 305 of the control subsystem 218 of an example depalletization system described above in connection with at least FIG. 1A to FIG. 3) may determine whether the comparative height measure satisfies a comparative height threshold range.

As described above in connection with at least step/operation 707 of FIG. 7B, the processing element determines whether one or more comparative dimension measures satisfy a comparative dimension threshold range. In the example shown at step/operation 1121 of FIG. 11A, the comparative dimension threshold range is a comparative height threshold range.

If, at step/operation 1121, the processing element determines that the comparative height measure satisfies a comparative height threshold range, the example method 1100 proceeds to step/operation 1123. At step/operation 1123, a processing element (such as, but not limited to, the processing element 305 of the control subsystem 218 of an example depalletization system described above in connection with at least FIG. 1A to FIG. 3) may cause an execution subsystem associated with the object depalletization system to operate in a constant pallet mode.

If, at step/operation 1121, the processing element determines that comparative height measure does not satisfy a comparative height threshold range, the example method 1100 proceeds to step/operation 1125. At step/operation 1125, a processing element (such as, but not limited to, the processing element 305 of the control subsystem 218 of an example depalletization system described above in connection with at least FIG. 1A to FIG. 3) may cause an execution subsystem associated with the object depalletization system to operate in a mode other than the constant pallet mode (for example, in the default mode).

Subsequent to and/or in response to step/operation 1123 and/or step/operation 1125, the example method 1100 proceeds to step/operation 1117 and ends.

As such, the examples shown in FIG. 10, FIG. 11A and FIG. 11B illustrate example methods of determining whether to trigger a constant pallet mode. For example, the perception subsystem may capture a 2-D image or a 3-D image that shows objects on a top, visible layer of the pallet. Based on the 2-D image and/or the 3-D image, the control subsystem may implement an object segmentation machine learning model to identify objects on the top, visible layer from the 2-D image and/or the 3-D image, and may calculate the length, width, and height of each object. In some embodiments, the control subsystem calculates differences in length between each two objects, differences in width between each two objects, and differences in height between each two objects. The control subsystem then compares these differences in length, differences in width, and differences in height with their corresponding comparative threshold ranges (which may be the same or different). If the differences in length, differences in width, and differences in height all satisfy their corresponding comparative threshold ranges, the control subsystem causes the execution subsystem to operate in the constant pallet mode. If any of the differences in length, differences in width, and differences in height does not satisfy their corresponding comparative threshold ranges, the control subsystem causes the execution subsystem to operate in a mode other than the constant pallet mode.

FIG. 12 is an example flow diagram illustrating an example method 1200 of causing an execution subsystem associated with the object depalletization system to operate in a constant pallet mode in accordance with various embodiments of the present disclosure.

In some embodiments, the execution subsystem comprises a depalletizer device, similar to the various examples described herein. In some embodiments, the execution subsystem comprises a height sensing device.

As shown in FIG. 12, the example method 1200 starts at step/operation 1202. Subsequent to and/or in response to step/operation 1202, the example method 1200 proceeds to step/operation 1204. At step/operation 1204, a processing element (such as, but not limited to, the processing element 305 of the control subsystem 218 of an example depalletization system described above in connection with at least FIG. 1A to FIG. 3) may cause the depalletizer device to convey a first object from the plurality of objects over the height sensing device.

In some embodiments, the processing element causes the depalletizer device to convey each of the plurality of objects over the height sensing device. In some embodiments, the depalletizer device is configured to convey each of the plurality of objects over the height sensing device.

For example, as shown in FIG. 9, the height sensing device 905 is disposed on an edge of the conveyor. While the depalletizer device depalletizes an object from the pallet onto the conveyor, the depalletizer device move the object over the height sensing device 905 and then onto the conveyor, and the height sensing device 905 may detect a height of the object.

Referring back to FIG. 12, subsequent to and/or in response to step/operation 1204, the example method 1200 proceeds to step/operation 1206. At step/operation 1206, a processing element (such as, but not limited to, the processing element 305 of the control subsystem 218 of an example depalletization system described above in connection with at least FIG. 1A to FIG. 3) may receive, from the height sensing device, first height data associated with the first object.

For example, the first height data may indicate a height of the first object as the depalletizer device moves the first object over the height sensing device at step/operation 1204. For example, the first height data may indicate a height from the bottom of the object to the ground.

Referring back to FIG. 12, subsequent to and/or in response to step/operation 1206, the example method 1200 proceeds to step/operation 1208. At step/operation 1208, a processing element (such as, but not limited to, the processing element 305 of the control subsystem 218 of an example depalletization system described above in connection with at least FIG. 1A to FIG. 3) may determine a lift height parameter associated with the depalletizer device in the constant pallet mode based at least in part on the first height data.

In some embodiments, the lift height parameter may define or indicate a height to which the depalletizer device should lift one or more other objects that are on the same pallet layer as the first object when the depalletizer device depalletizes the one or more objects from the pallet.

In some embodiments, when the execution subsystem is in a constant pallet mode, the processing element may determine lift height parameter for depalletizing objects in a pallet layer based on the height to which the depalletizer device lifts the first object in the pallet layer.

In some embodiments, the perception subsystem may determine, based at least in part on the image data, the height at which the objects are kept on the pallet and/or height at which the box is picked from the pallet.

Referring back to FIG. 12, subsequent to and/or in response to step/operation 1208, the example method 1200 proceeds to step/operation 1210. At step/operation 1210, a processing element (such as, but not limited to, the processing element 305 of the control subsystem 218 of an example depalletization system described above in connection with at least FIG. 1A to FIG. 3) may cause the depalletizer device to lift one or more objects other than the first object from the plurality of objects to a same lift height based at least in part on the lift height parameter.

In some embodiments, the processing element causes the depalletizer device to lift one or more objects other than the first object from the plurality of objects to a same lift height based at least in part on the lift height parameter when the execution subsystem is in the constant pallet mode.

In some embodiments, when the execution subsystem is in the constant pallet mode, the processing element causes the depalletizer device to lift one or more objects (other than the first object) that are on the same pallet layer to a same lift height based at least in part on the lift height parameter.

In some embodiments, the lift height (e.g. how high the depalletizer device should lift the object) may be determined based on the height of the object as detected by the perception subsystem, plus a max lift height parameter or the height of object as detected during constant pallet mode.

As such, the constant pallet mode described in accordance with various embodiments of the present disclosure may reduce the height as to which subsequent objects are moved from the pallets to the conveyor while still maintaining the safety of operations, therefore providing various technical improvement and advantages as described herein. In some embodiments, the lift height is not determined based on data form the perception subsystem, while the grasp pose height of the depalletizer device may be determined based on the data from the perception subsystem.

Referring back to FIG. 12, subsequent to and/or in response to step/operation 1210, the example method 1200 proceeds to step/operation 1212 and ends.

FIG. 13 is an example image illustrating example operations of the execution subsystem in a constant pallet mode in accordance with various embodiments of the present disclosure.

In particular, the example image 1301 shown in FIG. 13 illustrates example grasp poses (such as, but not limited to, a grasp pose 1303A and a grasp pose 1303B) associated with the depalletizer device of the execution subsystem. For example, each of the example grasp poses (such as, but not limited to, the grasp pose 1303A and the grasp poses 1303B) defines a position of the end effector of the depalletizer device to pick up one or more objects from the top, visible layer of the pallet. In some embodiments, example grasp poses (such as, but not limited to, the grasp pose 1303A and the grasp pose 1303B) may be generated based at least in part on one or more machine learning models.

As illustrated in the example shown in FIG. 13, the depalletizer device may incrementally lift and move the object from the pallet onto a conveyor. Further, as described above, when the depalletizer device is in constant pallet mode, the depalletizer device may lift each object to the same lift height.

FIG. 14A and FIG. 14B are example flow diagrams illustrating an example method 1400 of determining whether to cause the execution subsystem associated with the object depalletization system to exit the constant pallet mode in accordance with various embodiments of the present disclosure.

As shown in FIG. 14A, the example method 1400 starts at step/operation 1402. Subsequent to and/or in response to step/operation 1402, the example method 1400 proceeds to step/operation 1404. At step/operation 1404, a processing element (such as, but not limited to, the processing element 305 of the control subsystem 218 of an example depalletization system described above in connection with at least FIG. 1A to FIG. 3) may cause the depalletizer device to lift a second object from the plurality of objects to a lift height based at least in part on the lift height parameter when the execution subsystem is in constant pallet mode.

For example, prior to step/operation 1404, the processing element has caused the depalletizer device to lift a first object from the plurality of objects (similar to those in connection with at least step/operation 1202 of FIG. 12) and determined a lift height parameter similar to those in connection with at least step/operation 1208 of FIG. 12).

Further, as described above, when the execution subsystem is in a constant pallet mode, the depalletizer device may lift the rest of the plurality of objects on the pallet layer to a same height when unloading them from the pallet (for example, to a conveyor). As such, the depalletizer device may lift a second object from the plurality of objects to the same height based on the lift height parameter.

Referring back to FIG. 14A, subsequent to and/or in response to step/operation 1404, the example method 1400 proceeds to step/operation 1406. At step/operation 1406, a processing element (such as, but not limited to, the processing element 305 of the control subsystem 218 of an example depalletization system described above in connection with at least FIG. 1A to FIG. 3) may cause the depalletizer device to convey the second object over the height sensing device.

For example, the height sensing device is disposed on an edge of the conveyor. While the depalletizer device depalletizes the second object from the pallet onto the conveyor, the depalletizer device move the object over the height sensing device and then onto the conveyor, and the height sensing device may sense a height of the second object, similar to those described above in connection with at least step/operation 1204 of FIG. 12.

Referring back to FIG. 14A, subsequent to and/or in response to step/operation 1406, the example method 1400 proceeds to step/operation 1408. At step/operation 1408, a processing element (such as, but not limited to, the processing element 305 of the control subsystem 218 of an example depalletization system described above in connection with at least FIG. 1A to FIG. 3) may receive, from the height sensing device, second height data associated with the second object.

For example, the second height data may indicate a height of the second object as the depalletizer device moves the second object over the height sensing device at step/operation 1204.

Referring back to FIG. 14A, subsequent to and/or in response to step/operation 1408, the example method 1400 proceeds to block A, which connects FIG. 14A to FIG. 14B. Referring now to FIG. 14B, subsequent to and/or in response to step/operation 1408, the example method 1400 proceeds step/operation 1410. At step/operation 1410, a processing element (such as, but not limited to, the processing element 305 of the control subsystem 218 of an example depalletization system described above in connection with at least FIG. 1A to FIG. 3) may calculate an object height difference measure based at least in part on the first height data and the second height data.

In some embodiments, the object height difference measure may indicate a difference between the heights of objects. For example, the object height difference is measured between height of objects.

In some embodiments, various embodiments of the present disclosure may calculate the heights of the objects, and then determine the object height difference measure.

In some embodiments, height difference of objects in the constant pallet mode can be determined based at least in part on the height data from the height sensing device (e.g. LiDAR sensor). For example, the height of the box can be determined based on the height of the end effector of the depalletizer device from the ground minus the height of the bottom of the box from the ground as determined using the height sensing device. Subsequently, the height differences between objects can be determined.

In some embodiments, the first object is lifted to a determined height by the depalletizer device. In some embodiments, objects subsequent to the first object are lifted by a measure that is equal to or slightly greater than the height to which the first object is lifted.

Referring back to FIG. 14B, subsequent to and/or in response to step/operation 1410, the example method 1400 proceeds to step/operation 1412. At step/operation 1412, a processing element (such as, but not limited to, the processing element 305 of the control subsystem 218 of an example depalletization system described above in connection with at least FIG. 1A to FIG. 3) may determine whether the object height difference measure satisfies an object height difference measure threshold range.

For example, the processing element may determine whether the object height difference measure is within the object height difference measure threshold range. If so, the processing element may determine that the object height difference measure satisfies an object height difference measure threshold range. If not, the processing element may determine that the object height difference measure does not satisfy the object height difference measure threshold range.

If, at step/operation 1412, the processing element determines that the object height difference measure does not satisfy an object height difference measure threshold range, the example method 1400 proceeds to step/operation 1414. At step/operation 1414, a processing element (such as, but not limited to, the processing element 305 of the control subsystem 218 of an example depalletization system described above in connection with at least FIG. 1A to FIG. 3) may cause the execution subsystem associated with the object depalletization system to exit the constant pallet mode in response to determining that the object height difference measure does not satisfy the object height difference measure threshold range.

For example, if the processing element determines that the height associated with the second object is significantly different than (e.g. not within the object height difference measure threshold range) the height of the first object, the processing element may cause the execution subsystem to exit the constant pallet mode. Subsequently, the execution subsystem may recalibrate and calculate a lift height for a subsequent object based on image data from the perception subsystem.

If, at step/operation 1412, the processing element determines that the object height difference measure satisfies an object height difference measure threshold range, the example method 1400 proceeds to step/operation 1416. At step/operation 1416, a processing element (such as, but not limited to, the processing element 305 of the control subsystem 218 of an example depalletization system described above in connection with at least FIG. 1A to FIG. 3) may cause an execution subsystem associated with the object depalletization system to maintain in the constant pallet mode in response to determining that the object height difference measure satisfies the object height difference measure threshold range.

Referring back to FIG. 14B, subsequent to and/or in response to step/operation 1414 and/or step/operation 1416, the example method 1400 proceeds to step/operation 1418 and ends.

FIG. 15 is an example flow diagram illustrating an example method 1500 of determining whether to cause the execution subsystem associated with the object depalletization system to exit the constant pallet mode in accordance with various embodiments of the present disclosure.

As shown in FIG. 15, the example method 1500 starts at step/operation 1501. Subsequent to and/or in response to step/operation 1501, the example method 1500 proceeds to step/operation 1503. At step/operation 1503, a processing element (such as, but not limited to, the processing element 305 of the control subsystem 218 of an example depalletization system described above in connection with at least FIG. 1A to FIG. 3) may determine whether a depalletizer device has depalletized each of the plurality of objects that are on the same pallet layer.

For example, as described above, the processing element may determine the total number of objects on the top, visible layer of the pallet based at least in part on the 2-D image data and/or the object segmentation indications generated by the object segmentation machine learning model. The processing element may determine whether the depalletizer device has depalletized all the objects based on the total number.

Additionally, or alternatively, the processing element may determine grasp poses for the depalletizer device, and the processing element may determine whether the depalletizer device has executed all the grasp poses so as to determine whether the depalletizer device has depalletized each of the plurality of objects that are on the same pallet layer.

If, at step/operation 1503, the processing element determines that the depalletizer device has conveyed each of the plurality of objects that are on the same pallet layer, the example method 1500 proceeds to step/operation 1505. At step/operation 1505, a processing element (such as, but not limited to, the processing element 305 of the control subsystem 218 of an example depalletization system described above in connection with at least FIG. 1A to FIG. 3) may cause the execution subsystem associated with the object depalletization system to exit the constant pallet mode in response to determining that the depalletizer device has conveyed each of the plurality of objects that are on the same pallet layer.

For example, once the processing element determines that the depalletizer device has depalletized all the objects on the top, visible layer, the processing element may cause the execution subsystem to exit the constant pallet mode. Subsequently, the processing element may determine whether to cause the execution subsystem to enter the constant pallet mode when depalletizing the next layer of objects in accordance with various examples described herein.

If, at step/operation 1503, the processing element determines that the depalletizer device has not conveyed each of the plurality of objects that are on the same pallet layer, the example method 1500 proceeds to step/operation 1507. At step/operation 1507, a processing element (such as, but not limited to, the processing element 305 of the control subsystem 218 of an example depalletization system described above in connection with at least FIG. 1A to FIG. 3) may cause an execution subsystem associated with the object depalletization system to maintain in the constant pallet mode in response to determining that the depalletizer device has not conveyed each of the plurality of objects that are on the same pallet layer.

Referring back to FIG. 15, subsequent to and/or in response to step/operation 1505 and/or step/operation 1507, the example method 1500 proceeds to step/operation 1509 and ends.

FIG. 16A and FIG. 16B are example flow diagrams illustrating an example method 1600 of determining whether the execution subsystem associated with the object depalletization system should continue operating in the constant pallet mode in accordance with various embodiments of the present disclosure.

As shown in FIG. 16A, the example method 1600 starts at step/operation 1602. Subsequent to and/or in response to step/operation 1602, the example method 1600 proceeds to step/operation 1604. At step/operation 1604, a processing element (such as, but not limited to, the processing element 305 of the control subsystem 218 of an example depalletization system described above in connection with at least FIG. 1A to FIG. 3) may determine a first mean object height measure associated with the plurality of objects.

For example, the first mean object height measure may be determined based on an average of height measures, where each of height measures is a height measure of one of the objects on the top layer of the pallet to the pallet base/ground.

Referring back to FIG. 16A, subsequent to and/or in response to step/operation 1604, the example method 1600 proceeds to step/operation 1606. At step/operation 1606, a processing element (such as, but not limited to, the processing element 305 of the control subsystem 218 of an example depalletization system described above in connection with at least FIG. 1A to FIG. 3) may store, in a memory element, the first mean object height measure.

Referring back to FIG. 16A, subsequent to and/or in response to step/operation 1606, the example method 1600 proceeds to step/operation step/operation 1610. At step/operation 1610, a processing element (such as, but not limited to, the processing element 305 of the control subsystem 218 of an example depalletization system described above in connection with at least FIG. 1A to FIG. 3) may determine a second mean object height measure.

Similar to those described above in connection with step/operation 1604, the processing element may calculate a second mean object height measure associated with the plurality of objects (e.g. the objects that are on the top, visible layer). Similar to those described above, the second mean object height measure may be determined based on an average of height measures, where each of height measures is a height measure of one of the objects on the top layer of the pallet to the pallet base/ground.

In some embodiments, the second mean object height measure may be determined at a time point subsequent to the time point as to which the first mean object height measure is determined.

Referring back to FIG. 16A, subsequent to and/or in response to step/operation 1610, the example method 1600 proceeds to block A, which connects FIG. 16A to FIG. 16B. Referring now to FIG. 16B, subsequent to and/or in response to step/operation 1610, the example method 1600 proceeds step/operation 1612. At step/operation 1612, a processing element (such as, but not limited to, the processing element 305 of the control subsystem 218 of an example depalletization system described above in connection with at least FIG. 1A to FIG. 3) may calculate an average height difference measure based on the first mean object height measure and the second mean object height measure.

For example, the processing element may calculate the average height difference measure by subtracting the second mean object height measure from the first mean object height measure.

Referring back to FIG. 16B, subsequent to and/or in response to step/operation 1612, the example method 1600 proceeds to step/operation 1614. At step/operation 1614, a processing element (such as, but not limited to, the processing element 305 of the control subsystem 218 of an example depalletization system described above in connection with at least FIG. 1A to FIG. 3) may determine whether average height difference measure satisfies an average height difference measure threshold range.

For example, if the average height difference measure is within the average height difference measure threshold range, the processing element determines that the average height difference satisfies an average height difference measure threshold range. If the average height difference measure is outside the average height difference measure threshold range, the processing element determines that the average height difference does not satisfy an average height difference measure threshold range.

If, at step/operation 1614, the processing element determines that average height difference measure satisfies an average height difference measure threshold range, the example method 1600 proceeds to step/operation 1616. At step/operation 1616, a processing element (such as, but not limited to, the processing element 305 of the control subsystem 218 of an example depalletization system described above in connection with at least FIG. 1A to FIG. 3) may replace the first mean object height measure in the memory element with the second mean object height measure in response to determining that the average height difference measure satisfies the average height difference measure threshold range.

For example, the processing element may update the mean object height measure stored in the memory so as to reflect an accurate height measure based on the remaining objects that have not been depalletized.

If, at step/operation 1614, the processing element determines that average height difference measure does not satisfy an average height difference measure threshold range, the example method 1600 proceeds to step/operation 1618. At step/operation 1618, a processing element (such as, but not limited to, the processing element 305 of the control subsystem 218 of an example depalletization system described above in connection with at least FIG. 1A to FIG. 3) may cause the execution subsystem associated with the object depalletization system to exit the constant pallet mode in response to determining that the average height difference measure does not satisfy the average height difference measure threshold range.

For example, if the average height difference measure does not satisfy the average height difference measure threshold range, the processing element determines that the average height associated with the remaining objects that have not been depalletized are significantly different from the average heights of the objects when the constant pallet mode was first triggered. In such an example, the processing element causes the execution subsystem to exit the constant pallet mode so that the execution subsystem may recalibrate and calculate a lift height for a subsequent object based on image data from the perception subsystem.

Referring back to FIG. 16B, subsequent to and/or in response to step/operation 1616 and/or step/operation 1618, the example method 1600 proceeds to step/operation 1620 and ends.

FIG. 17 is an example flow diagram illustrating an example method 1700 associated with an object depalletization system in accordance with various embodiments of the present disclosure.

At step/operation 1701, the perception subsystem of the object depalletization system captures image data (such as, but not limited to, 2-D image data and/or 3-D image data as described above). At step/operation 1703, the control subsystem of the object depalletization system determines whether to cause the execution subsystem to enter into constant pallet mode based on the various example methods described herein. If so, the control subsystem generates and stores all the grasp poses for the depalletizer device at step/operation 1707. In some embodiments, the lift height is determined after the first pick of the object from the pallet.

At step/operation 1710, the control subsystem determines whether all the grasp poses associated with the depalletizer device have been executed. For example, if all the grasp poses have been executed, it means that all the objects on the top pallet layer have been depalletized, and the control subsystem triggers the perception subsystem to generate image data from the next layer of objects, and determine whether to cause the execution subsystem to enter into constant pallet mode when depalletizing the next layer of objects.

If, at step/operation 1710, the control subsystem determines that not all the grasp poses are executed, the control subsystem sends grasp poses incrementally to the depalletizer device for execution at step/operation 1709.

If the control subsystem determines not to cause the execution subsystem to enter into constant pallet mode at step/operation 1703, and/or subsequent to sending the grasp poses incrementally to the depalletizer device for execution at step/operation 1709, the depalletizer device may check the feasibility for each grasp pose at step/operation 1705, and may cause grasp trajectories defined by the grasp poses to be executed at step/operation 1712.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus associated with an object depalletization system, the apparatus comprising at least one processor and at least one non-transitory memory comprising a computer program code, the at least one non-transitory memory and the computer program code configured to, with the at least one processor, cause the apparatus to:

receive, from a perception subsystem associated with the object depalletization system, first imaging data associated with a plurality of objects disposed on a pallet;

calculate, based at least in part on the first imaging data, one or more comparative dimension measures associated with the plurality of objects;

determine whether the one or more comparative dimension measures satisfy a comparative dimension threshold range; and in response to determining that the one or more comparative dimension measures satisfy the comparative dimension threshold range, transmit control instructions to cause an execution subsystem comprising a depalletizer device associated with the object depalletization system to operate in a constant pallet mode in which all objects on a top layer of the pallet are depalletized with the apparatus using same settings for the depalletizer device; and transmit control instructions to the execution subsystem to end the constant pallet mode when an object height difference between a first object and a second object of the plurality of objects in the same top layer of the pallet is not within a height difference threshold range, wherein height of the first object and the second object of the plurality of objects is received from the execution subsystem associated with the object depalletization system.

2. The apparatus of claim 1, wherein the perception subsystem comprises a two dimensional (2-D) image capturing device, wherein the first imaging data comprises 2-D image data associated with the plurality of objects and captured by the 2-D image capturing device.

3. The apparatus of claim 1, wherein the perception subsystem comprises a three dimensional (3-D) image capturing device, wherein the first imaging data comprises 3-D image data associated with the plurality of objects and captured by the 3-D image capturing device.

4. The apparatus of claim 1, wherein, prior to calculating the one or more comparative dimension measures associated with the plurality of objects, the at least one non-transitory memory and the computer program code are configured to, with the at least one processor, cause the apparatus to:

input the first imaging data to an object segmentation machine learning model, wherein the first imaging data comprises at least one of 2-D image data associated with the plurality of objects; and receive, from the object segmentation machine learning model, a plurality of object segmentation indications associated with the at least one of 2-D image data.

5. The apparatus of claim 4, wherein calculating the one or more comparative dimension measures is based at least in part on the plurality of object segmentation indications.

6. The apparatus of claim 1, wherein, when calculating the one or more comparative dimension measures associated with the plurality of objects, the at least one non-transitory memory and the computer program code are configured to, with the at least one processor, cause the apparatus to:

determine, based at least in part on 2-D image data or 3-D image data from the perception subsystem, a first image-dimension measure associated with the first object;

determine, based at least in part on the 2-D image data or the 3-D image data from the perception subsystem, a second image-dimension measure associated with the second object; and determine the one or more comparative dimension measures based at least in part on the first image-dimension measure and the second image-dimension measure.

7. A computer-implemented method comprising:

receiving, from a perception subsystem associated with an object depalletization system, first imaging data associated with a plurality of objects disposed on a pallet;

calculating, based at least in part on the first imaging data, one or more comparative dimension measures associated with the plurality of objects;

determining whether the one or more comparative dimension measures satisfy a comparative dimension threshold range; and in response to determining that the one or more comparative dimension measures satisfy the comparative dimension threshold range, transmitting control instructions to cause an execution subsystem comprising a depalletizer device associated with the object depalletization system to operate in a constant pallet mode in which all objects on a top layer of the pallet are depalletized using same settings for the depalletizer device; and transmitting control instructions to the execution subsystem to end the constant pallet mode when an object height difference between a first object and a second object of the plurality of objects in the same top layer of the pallet is not within a height difference threshold range, wherein height of the first object and the second object of the plurality of objects is received from the execution subsystem associated with the object depalletization system.

8. The computer-implemented method of claim 7, wherein the perception subsystem comprises a two dimensional (2-D) image capturing device, wherein the first imaging data comprises 2-D image data associated with the plurality of objects and captured by the 2-D image capturing device.

9. The computer-implemented method of claim 7, wherein the perception subsystem comprises a three dimensional (3-D) image capturing device, wherein the first imaging data comprises 3-D image data associated with the plurality of objects and captured by the 3-D image capturing device.

10. The computer-implemented method of claim 7, wherein, prior to calculating the one or more comparative dimension measures associated with the plurality of objects, the computer-implemented method further comprises:

inputting the first imaging data to an object segmentation machine learning model, wherein the first imaging data comprises at least one of 2-D image data associated with the plurality of objects; and receiving, from the object segmentation machine learning model, a plurality of object segmentation indications associated with the at least one of 2-D image data.

11. The computer-implemented method of claim 10, wherein calculating the one or more comparative dimension measures is based at least in part on the plurality of object segmentation indications.

12. The computer-implemented method of claim 7, wherein, when calculating the one or more comparative dimension measures associated with the plurality of objects, the computer-implemented method further comprises:

determining, based at least in part on 2-D image data or 3-D image data from the perception subsystem, a first image-dimension measure associated with the first object;

determining, based at least in part on the 2-D image data or the 3-D image data from the perception subsystem, a second image-dimension measure associated with the second object; and determining the one or more comparative dimension measures based at least in part on the first image-dimension measure and the second image-dimension measure.

13. A computer program product comprising at least one non-transitory computer-readable storage medium having computer-readable program code portions stored therein, the computer-readable program code portions comprising an executable portion configured to:

receive, from a perception subsystem associated with an object depalletization system, first imaging data associated with a plurality of objects disposed on a pallet;

calculate, based at least in part on the first imaging data, one or more comparative dimension measures associated with the plurality of objects;

determine whether the one or more comparative dimension measures satisfy a comparative dimension threshold range; and in response to determining that the one or more comparative dimension measures satisfy the comparative dimension threshold range, transmit control instructions to cause an execution subsystem comprising a depalletizer device associated with the object depalletization system to operate in a constant pallet mode in which all objects on a top layer of the pallet are depalletized using same settings for the depalletizer device; and transmit control instructions to the execution subsystem to end the constant pallet mode when an object height difference between a first object and a second object of the plurality of objects in the same top layer of the pallet is not within a height difference threshold range, wherein height of the first object and the second object of the plurality of objects is received from the execution subsystem associated with the object depalletization system.

14. The computer program product of claim 13, wherein the perception subsystem comprises a two dimensional (2-D) image capturing device, wherein the first imaging data comprises 2-D image data associated with the plurality of objects and captured by the 2-D image capturing device.

15. The computer program product of claim 13, wherein the perception subsystem comprises a three dimensional (3-D) image capturing device, wherein the first imaging data comprises 3-D image data associated with the plurality of objects and captured by the 3-D image capturing device.

16. The computer program product of claim 13, wherein, prior to calculating the one or more comparative dimension measures associated with the plurality of objects, the computer-readable program code portions comprise the executable portion configured to:

input the first imaging data to an object segmentation machine learning model, wherein the first imaging data comprises at least one of 2-D image data associated with the plurality of objects; and receive, from the object segmentation machine learning model, a plurality of object segmentation indications associated with the at least one of 2-D image data.

17. The computer program product of claim 16, wherein calculating the one or more comparative dimension measures is based at least in part on the plurality of object segmentation indications.

18. The apparatus of claim 1, wherein the execution subsystem further comprises a height sensing device, and wherein the at least one non-transitory memory and the computer program code are configured to, with the at least one processor, cause the apparatus to:

receive, from the height sensing device, a first height data associated with the first object;

determine a lift height parameter associated with the depalletizer device in the constant pallet mode based at least in part on the first height data; and cause the depalletizer device to lift one or more objects from the plurality of objects other than the first object to a same lift height based at least in part on the lift height parameter when the execution subsystem is in the constant pallet mode.

19. The computer-implemented method of claim 7, further comprising:

receiving, from a height sensing device, a first height data associated with the first object;

determining a lift height parameter associated with the depalletizer device in the constant pallet mode based at least in part on the first height data; and causing the depalletizer device to lift one or more objects from the plurality of objects other than the first object to a same lift height based at least in part on the lift height parameter when the execution subsystem is in the constant pallet mode.

20. The computer program product of claim 13, wherein the execution subsystem further comprises a height sensing device, and wherein the executable portion is further configured to:

receive, from the height sensing device, a first height data associated with the first object;

determine a lift height parameter associated with the depalletizer device in the constant pallet mode based at least in part on the first height data; and cause the depalletizer device to lift one or more objects from the plurality of objects other than the first object to a same lift height based at least in part on the lift height parameter when the execution subsystem is in the constant pallet mode.

* * * * *